United States Patent
Higuchi et al.

(10) Patent No.: US 11,203,688 B2
(45) Date of Patent: Dec. 21, 2021

(54) COMPOSITE CONTAINING ORGANIC/METALLIC HYBRID POLYMER AND IONIC LIQUID, ELECTROCHROMIC DEVICE IN WHICH SAME IS USED, AND METHOD FOR MANUFACTURING SAID COMPOSITE AND DEVICE

(71) Applicant: NATIONAL INSTITUTE FOR MATERIALS SCIENCE, Tsukuba (JP)

(72) Inventors: Masayoshi Higuchi, Tsukuba (JP); Miki Kanao, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 77 days.

(21) Appl. No.: 16/318,634

(22) PCT Filed: Jul. 11, 2017

(86) PCT No.: PCT/JP2017/025268
§ 371 (c)(1),
(2) Date: Jan. 17, 2019

(87) PCT Pub. No.: WO2018/016385
PCT Pub. Date: Jan. 25, 2018

(65) Prior Publication Data
US 2019/0284347 A1    Sep. 19, 2019

(30) Foreign Application Priority Data
Jul. 19, 2016    (JP) ............................. JP2016-141734

(51) Int. Cl.
| | | |
|---|---|---|
| *H01B 1/12* | (2006.01) | |
| *G02F 1/15* | (2019.01) | |
| *C08L 101/00* | (2006.01) | |
| *G02F 1/1516* | (2019.01) | |
| *C08G 83/00* | (2006.01) | |
| *G02F 1/1523* | (2019.01) | |
| *G02F 1/155* | (2006.01) | |
| *C09K 9/02* | (2006.01) | |
| *G02F 1/1524* | (2019.01) | |

(52) U.S. Cl.
CPC .......... *C08L 101/00* (2013.01); *C08G 83/001* (2013.01); *C09K 9/02* (2013.01); *G02F 1/155* (2013.01); *G02F 1/1525* (2013.01); *G02F 1/15165* (2019.01); *G02F 1/1524* (2019.01); *G02F 2001/164* (2019.01); *Y02P 20/54* (2015.11)

(58) Field of Classification Search
CPC .............. H01B 1/122; H01M 10/0566; H01M 10/0565; H01M 2300/0091; H01M 2300/0045; H01M 2300/0082; H01M 2300/0088; H01G 11/56; H01G 11/54; H01G 11/58; Y02E 60/13; Y02E 60/10; G02F 1/15; G02F 1/1514; G02F 1/1516
See application file for complete search history.

(56) References Cited

U.S. PATENT DOCUMENTS

2018/0088426 A1* 3/2018 Posset .................... G02F 1/153

FOREIGN PATENT DOCUMENTS

| EP | 2851745 A1 | 3/2015 | |
|---|---|---|---|
| JP | 2007112957 A | 5/2007 | |
| JP | 2010527890 A | 8/2010 | |
| JP | 2012501008 A | 1/2012 | |
| JP | 2012188517 A | 10/2012 | |
| JP | 2014178493 A | 9/2014 | |
| JP | 2015156364 A | 8/2015 | |
| WO | WO 2008/146674 A1 | 12/2008 | |
| WO | WO 2013/161452 A1 | 10/2013 | |
| WO | WO-2016150921 A1 * | 9/2016 | ............... C09K 9/02 |

OTHER PUBLICATIONS

Organic electron-rich N-heterocyclic compound as a chemical bridge: building a Bronsted acidic ionic liquid confined in MIL-101 nanocages, Luo et al., J. Mater. Chem. A, 2013, 1, 6530-6534.*
Office Action in Europe Application No. 17830904.3, dated Jun. 24, 2020, 9 pages.
English translation of document D3a: Miki Kanao et al., "Development of Electrochromic Devices Using Metallo-Supramolecular Polymer and Various Gel Electrolyte", vol. 65, dated Jan. 1, 2016, XP055706773, 6 pages.
Office Action in Japan Application No. 2018-528501, including English translation, dated Oct. 1, 2019, 7 pages.
International Preliminary Report on Patentability in International Application No. PCT/JP2017/025268, dated Jan. 31, 2019, 13 pages.
Seino et al., "Development of Thermally Tough Electrochromatic Devices Using Metallo-Supramolecular Polymer", J Mater. Chem. C, 2014, 2, 9331, published Mar. 16, 2017.
Seino et al., "Development of thermally tough electrochromatic devices using metallo-supramolecular polymer", J Mater. Chem. C, 2014, 2, 9331, published Mar. 3, 2017.
Seino et al., "Investigation of thermal stability of electrochromic devices using metallo-supramolecular polymer", J Mater. Chem. C, 2014, 2, 9331, published Sep. 1, 2016.
Seino et al., "Investigation of thermal stability of electrochromic devices using metallo-supramolecular polymer", J Mater. Chem. C, 2014, 2, 9331, published Aug. 24, 2016.

(Continued)

*Primary Examiner* — Haidung D Nguyen
(74) *Attorney, Agent, or Firm* — Crowell & Moring LLP

(57) ABSTRACT

The present invention relates to a composite having exceptional heat resistance and durability that exhibits quick response characteristics when used in an electrochromic device; an electrochromic device in which the composite is used; and a method for producing said composite and device. This composite contains an organic/metallic hybrid polymer that contains an organic ligand and a metal ion coordinated to the organic ligand, and an ionic liquid. The organic/metallic hybrid polymer forms ionic bonds with the ionic liquid. This electrochromic device comprises a first electrode, an electrochromic layer containing the composite, an electrolyte layer, and a second electrode.

7 Claims, 4 Drawing Sheets

(56) References Cited

OTHER PUBLICATIONS

Kanao et al., "Development of electrochromatic devices using metallo-supramolecular polymer and various gel electrolyte", Polymer Preprints, Japan, vol. 65, No. 1, 2016, published May 10, 2016.
Extended European Search Report for Europe Application No. 17830904.3 dated Nov. 8, 2019, 8 pages.
Ju-Hsiou Liao et al., "Ionic Liquid as Solvent for the Synthesis and Crystallization of a Coordination Polymer: (EMI) [Cd(BTC)] (EMI= 1-Ethyl-3-methylimidazolium, BTC= 1,3,5-Benzenetricarboxylate)" Crystal Growth & Design., vol. 6, No. 5, dated published on Web: Mar. 31, 2006, XP055637579, 2 pages.
Kun Jin et al., "[Cu(i)(bpp)]BF4: the first extended coordination network prepared solvothermally in an ionic liquid solvent" Chemical Communications, No. 23, dated Oct. 31, 2002, XP055637683, 2 pages.
Jin et al., "[Cu(l)(bpp)]BF4: the first extended coordination network prepared solvothermally in an ionic liquidsolvent", Chemical Communications, vol. 23, No. 31, pp. 2872-2873.
Office Action in China Application No. 201780044501.1, dated Oct. 10, 2020, including English translation, 26 pages.
Office Action in China Application No. 201780044501.1, including English translation, dated Apr. 28, 2021, 35 pages.
https://www.emdmillipore.com/US/en/product/1-Butyl-3-methylimidazolium bis 9trifluoromethylsulfonyl) imide for synthesis. CAS 174899-83-3, chemical formula C8H1bN2C2F6NO4S2, Millipore Sigma, 2021, Merck KgaA, dated Jun. 22, 2021 4 pp.
Suojiang Zhang et al, Physical Properties of Ionic Liquids: Database and Evaluation, Research Gate uploaded May 22, 2014, J. Phys. Chem. Ref. Data, vol. 35, No. 4, Dec. 2006, 44 pp.

\* cited by examiner

EXAMPLE 2 @ 150°C, > 85%

EXAMPLE 2 @ 150°C, 50%

EXAMPLE 3 @ 50°C, > 85%

EXAMPLE 4 @ 50°C, > 85%

EXAMPLE 5 @ 150°C, > 85%

EXAMPLE 6 @ 50°C, > 85%

COMPOSITE CONTAINING ORGANIC/METALLIC HYBRID POLYMER AND IONIC LIQUID, ELECTROCHROMIC DEVICE IN WHICH SAME IS USED, AND METHOD FOR MANUFACTURING SAID COMPOSITE AND DEVICE

RELATED APPLICATIONS

This application is a 371 application of PCT/JP2017/025268 having an international filing date of Jul. 11, 2017, which claims priority to JP 2016-141734 filed Jul. 19, 2016, the entire content of each of which is incorporated herein by reference.

TECHNICAL FIELD

The present invention relates to a composite containing an organic/metallic hybrid polymer and an ionic liquid, an electrochromic device in which the same is used, and a method for producing each of the composite and the electrochromic device.

BACKGROUND ART

Recently, an electrochromic material has attracted attention as a display material. Various organic/metallic hybrid polymers have been developed as such an electrochromic material, and electrochromic devices using the same have been known (see, for example, Patent Literatures 1 and 2). Patent Literatures 1 and 2 disclose an organic/metallic hybrid polymer in which an organic ligand is a terpyridine group or a phenanthroline group and to which a metal ion is coordinated, and an electrochromic device thereof. However, it is desired that these electrochromic devices can withstand use under high temperatures.

On the other hand, various modifications have been made so as to improve performance of electrochromic devices (see, for example, Patent Literatures 3 and 4). In Patent Literatures 3 and 4, performance improvement of an electrochromic device is reported by using an ionic liquid for an electrolyte layer. However, further improvement in response speed, contrast, and durability of these electrochromic devices is required.

CITATION LIST

Patent Literature

Patent Literature 1: JP-A-2007-112957
Patent Literature 2: JP-A-2012-188517
Patent Literature 3: JP-A-2012-501008
Patent Literature 4: JP-A-2014-178493

SUMMARY OF INVENTION

Technical Problem

It is an object of the present invention to provide a composite containing a novel component composition which has not exited in prior art and can be used for an electrochromic device, an electrochromic device in which the same is used, and a method for producing each of the composite and the electrochromic device.

Solution to Problem

A composite according the present invention includes: an organic/metallic hybrid polymer containing an organic ligand and a metal ion coordinated to the organic ligand; and an ionic liquid, wherein the organic/metallic hybrid polymer forms ionic bonds with the ionic liquid.

The organic ligand may be selected from the group consisting of a terpyridine group, a phenanthroline group, a bipyridine group, an imino group, and derivatives thereof.

The metal ion may be a metal ion selected from the group consisting of Pt, Cu, Ni, Pd, Ag, Mo, Fe, Co, Ru, Rh, Eu, Zn, and Mn.

The ionic liquid may be a combination of an anion selected from the group consisting of tetrafluoroborate, hexafluorophosphate, bis(trifluoromethanesulfonyl)imide, and bis(pentafluoroethylsulfonyl)imide and a cation selected from the group consisting of imidazolium, pyrrolidinium, and tetraalkylammonium.

The ionic liquid may have a potential window ranging from a negative potential of at least −1 V vs Ag/Ag$^+$ or less to a positive potential of +2 V vs Ag/Ag$^+$ or more.

The ionic liquid may have a melting point of room temperature or less.

The organic/metallic hybrid polymer and the ionic liquid may be contained such that a molar ratio of the ionic liquid to a repeating structural unit of the organic/metallic hybrid polymer is 0.1 or more and 4.0 or less.

The organic/metallic hybrid polymer may be an organic/metallic hybrid polymer represented by a general formula selected from the group consisting of general Formulae (I), (II), and (III):

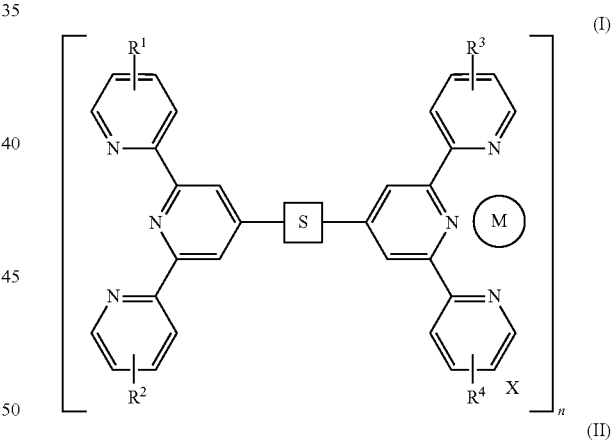

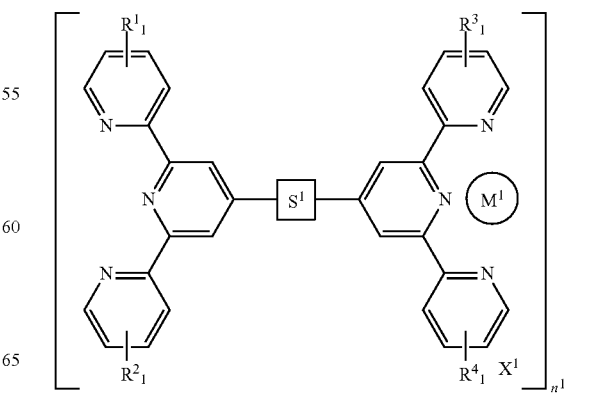

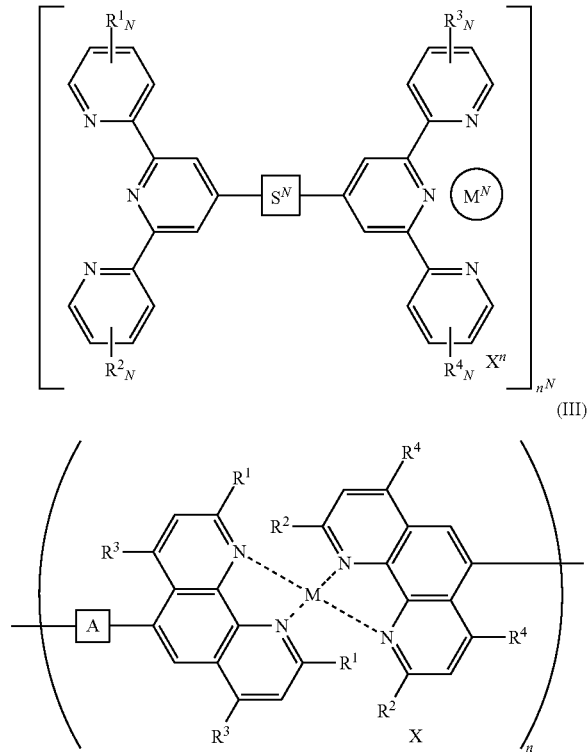

(III)

wherein, in Formula (I), M represents a metal ion, X represents a counter anion, S represents a spacer containing a carbon atom and a hydrogen atom or a spacer directly linking two terpyridine groups, $R^1$ to $R^4$ each independently represent a hydrogen atom or a substituent, and n is an integer of 2 or more representing the degree of polymerization, in Formula (II), $M^1$ to $M^N$ (N is an integer of 2 or more) each independently represent metal ions having different redox potentials, $X^1$ to $X^n$ (n is an integer of 2 or more) each independently represent a counter anion, $S^1$ to $S^N$ (N is an integer of 2 or more) each independently represent a spacer containing a carbon atom and a hydrogen atom or a spacer directly linking two terpyridine groups, $R^1_1$ to $R^1_N$, $R^2_1$ to $R^2_N$, $R^3_1$ to $R^3_N$, and $R^4_1$ to $R^4_N$ (N is an integer of 2 or more) each independently represent a hydrogen atom or a substituent, and $n_1$ to $n_N$ are each independently an integer of 2 or more which represents the degree of polymerization, and in Formula (III), M represents a metal ion, X represents a counter anion, A represents a spacer containing a carbon atom and a hydrogen atom or a spacer directly linking two phenanthroline groups, $R^1$ to $R^4$ each independently represent a hydrogen atom or a substituent, and n is an integer of 2 or more which represents the degree of polymerization.

The organic/metallic hybrid polymer and the ionic liquid may be dissolved in a solvent selected from the group consisting of water, dimethylformamide, dimethylsulfoxide, ethanol, and methanol.

A method for producing the above-mentioned composite according to the present invention includes: a step of contacting an organic/metallic hybrid polymer, which contains an organic ligand and a metal ion coordinated to the organic ligand, with an ionic liquid.

The electrochromic device according to the present invention includes: a first electrode; an electrochromic layer disposed on the first electrode; an electrolyte layer disposed on the electrochromic layer; and a second electrode disposed on the electrolyte layer, wherein the electrochromic layer includes the above-mentioned composite, thereby solving the above problems.

The electrolyte layer may contain at least a polymer and a supporting salt.

The electrolyte layer may further contain an ion accumulation material selected from the group consisting of viologen, N,N,N',N'-tetramethyl-p-phenylenediamine, and an organometallic complex.

The polymer may be selected from the group consisting of poly(methyl methacrylate) (PMMA), polyethylene oxide (PEO), poly(vinylidene fluoride-co-hexafluoroisopropyl) (PVdF-co-PHFP), polypropylene carbonate (PPC), polycarbonate, and polyacrylonitrile.

The supporting salt may be selected from the group consisting of $LiClO_4$, $LiBF_4$, $LiAsF_6$, $LiPF_6$, $LiCF_3SO_3$, $LiCF_3COO$, lithium bis(trifluoromethanesulfonyl)imide (LiTFSI), $LiCH_3COO$, tetrabutylammonium perchlorate, tetraethylammonium perchlorate, KCl, $NaClO_3$, NaCl, $NaBF_4$, NaSCN, $KBF_4$, $Mg(ClO_4)_2$, and $Mg(BF_4)_2$.

The electrolyte layer may further contain a plasticizer selected from the group consisting of propylene carbonate (PC), ethylene carbonate, dimethyl carbonate, diethyl carbonate, γ-butyrolactone, succinonitrile, and an ionic liquid, and the ionic liquid may be a combination of an anion selected from the group consisting of tetrafluoroborate, hexafluorophosphate, bis(trifluoromethanesulfonyl)imide, and bis(pentafluoroethylsulfonyl)imide and a cation selected from the group consisting of imidazolium, pyrrolidinium, and tetraalkylammonium.

The electrochromic device may be sealed with a sealant containing an epoxy resin and/or a silicone resin.

A method for producing the electrochromic device according to the present invention includes: a step of applying a material containing at least the above-mentioned composite on a first electrode to form an electrochromic layer; and a step of forming an electrolyte layer and a second electrode in this order on the electrochromic layer.

Another method for producing the electrochromic device according to the present invention includes: a step of applying a material, which contains an organic/metallic hybrid polymer containing an organic ligand and a metal ion coordinated to the organic ligand, on a first electrode to form an organic/metallic hybrid polymer layer; a step of applying an electrolyte material containing an ionic liquid and a second electrode in this order on the organic/metallic hybrid polymer layer to form a structure including the first electrode, the organic/metallic hybrid polymer layer, the electrolyte layer, and the second electrode; and a step of subjecting the structure to a heat treatment.

ADVANTAGEOUS EFFECTS OF INVENTION

According to the present invention, there are provided a novel composite which has not been developed in prior art, an electrochromic device in which the same is used, and a method for producing each of the composite and the electrochromic device.

Further, the composite according to the present invention can preferably have excellent heat resistance due to an ionic liquid forming ionic bonds with an organic/metallic hybrid polymer. The composite according to the present invention can promote retention of a counter anion in response to a change in valence of a metal ion in an organic/metallic hybrid polymer by an ionic liquid forming ionic bonds. As a result, when the composite of the present invention is used in the electrochromic layer, the counter anion can be moved from the adjacent electrolyte layer in response to the change in the valence of the metal ion in the organic/metallic hybrid polymer and can be held in the composite, thereby achieving quick response properties. Moreover, since the composite according to the present invention is produced by simple contact, it is advantageous since a special device is unnecessary.

The method for producing the electrochromic device according to the present invention is advantageous since the above-mentioned composite has only to be applied as the electrochromic layer and thus a special device is unnecessary.

In another method for producing an electrochromic device according to the present invention, a structure including a first electrode, an organic/metallic hybrid polymer layer, an electrolyte layer containing an ionic liquid, and a second electrode is formed, at least part of the ionic liquid moves from the electrolyte layer to the organic/metallic hybrid polymer layer by heat treatment, and the organic/metallic hybrid polymer and the ionic liquid in the organic/metallic hybrid polymer layer form ionic bonds, thereby obtaining the composite. Moreover, since the solvent of the entire structure is removed by heating, the response speed, contrast, and repetitive driving stability (durability) can be improved.

DESCRIPTION OF EMBODIMENTS

Figure 1:
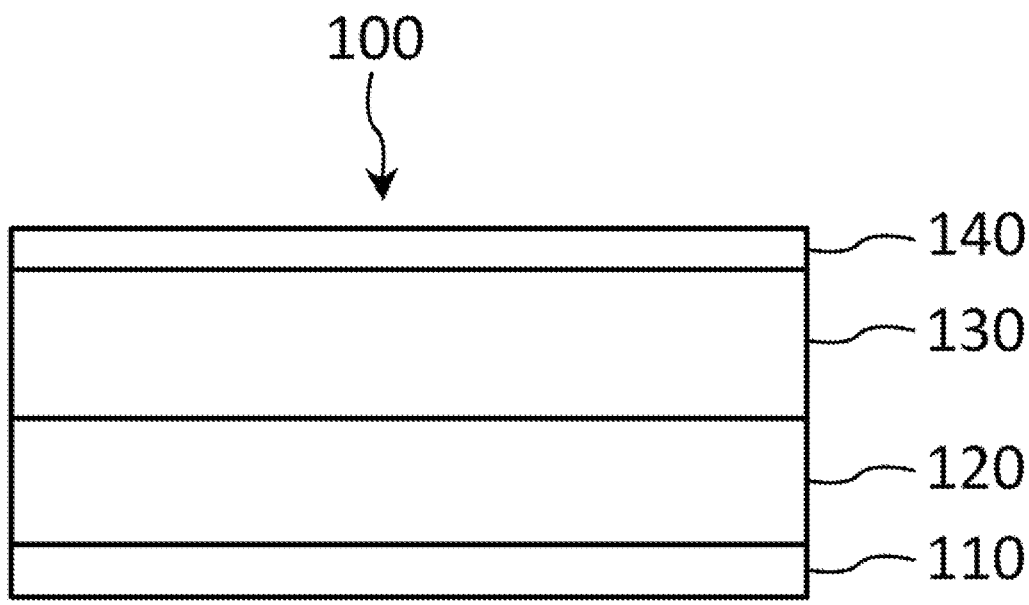
FIG. 1 is a schematic diagram illustrating an electrochromic device according to Embodiment 2 of the present invention.

Hereinafter, embodiments of the present invention will be described with reference to the drawings. The same numbers are assigned to the same elements, and the description thereof is omitted.

Embodiment 1

In Embodiment 1, a composite of the present invention and a producing method thereof will be described in detail.

The composite of the present invention contains at least an organic ligand, an organic/metallic hybrid polymer containing a metal ion coordinated to the organic ligand, and an ionic liquid. Furthermore, in the composite of the present invention, the organic/metallic hybrid polymer forms ionic bonds with the ionic liquid.

Here, the organic ligand is not particularly limited as long as the organic ligand is an organic compound that is capable of coordinating a metal ion and is polymerizable by polymerization, but is preferably selected from the group consisting of a terpyridine group, a phenanthroline group, a bipyridine group, an imino groups, and derivatives thereof. The organic ligand constituting the composite may be of one kind or plural kinds. By coordinating such an organic ligand with the metal ion and forming a complex, the organic ligand and the metal ion are alternately linked to each other to constitute the organic/metallic hybrid polymer.

The terpyridine group is typically 2,2':6',2''-terpyridine, but it may be a derivative having various substituents. Examples of the substituents include a halogen atom, a hydrocarbon group, a hydroxyl group, an alkoxy group (for example, $C_1$-$C_{10}$), a carbonyl group, a carboxylic ester group (for example, $C_1$-$C_{10}$), an amino group, a substituted amino group, an amide group, a substituted amide group, a cyano group, and a nitro group. Examples of the hydrocarbon group can include a linear or branched alkyl group such as $C_1$-$C_{10}$, specifically, a methyl group, an ethyl group, an n-propyl group, an i-propyl group, an n-butyl group, and a t-butyl group. Furthermore, examples of the substituents that these substituents may have include, but not limited to, a $C_1$-$C_{10}$ alkyl group such as a methyl group, an ethyl group, or a hexyl group, a $C_1$-$C_{10}$ alkoxy group such as a methoxy group or a butoxy group, and a halogen atom such as chlorine or bromine.

The bipyridine group is 2,2'-bipyridine, 3,3'-bipyridine, 4,4'-bipyridine, 2,3'-bipyridine, 2,4'-bipyridine, or 3,4'-bipyridine, but the bipyridine may be a derivative having various substituents therein. Here, exemplary substituents are the same as described above.

The imino group can be a derivative having C=N and having various substituents therein. Exemplary substituents that the derivative can have are the same as described above.

The phenanthroline group is obtained by substituting any two carbon atoms of phenanthrene with nitrogen atoms, but may be a derivative having various substituents therein. Examples of the substituents that the derivative may have include, but not limited to, a methyl group, a t-butyl group, a phenyl group, a thienyl group, a bithienyl group, a terthienyl group, a phenylacetyl group, and the like.

The metal ion can be any metal ion that changes its valence by an oxidation-reduction reaction, but is preferably a metal ion selected from the group consisting of Pt, Cu, Ni, Pd, Ag, Mo, Fe, Co, Ru, Rh, Eu, Zn, and Mn. These metal ions coordinate with the above-mentioned organic ligands. More preferably, when the organic ligand is a terpyridine group or a derivative thereof, a hexacoordinate metal ion is selected, and when the organic ligand is a phenanthroline group, a bipyridine group, an imino group, or a derivative thereof, a tetracoordinate metal ion is selected. The metal ion constituting the composite may be of one kind or plural kinds. In particular, when plural kinds of organic ligands are used, plural types of metal ions may be used.

The ionic liquid can include any ionic liquid in which an organic/metallic hybrid polymer forms ionic bonds, but in particular, may be a combination of an anion selected from the group consisting of tetrafluoroborate, hexafluorophosphate, bis(trifluoromethanesulfonyl)imide, and bis(pentafluoroethylsulfonyl)imide and a cation selected from the group consisting of imidazolium, pyrrolidinium, and tetraalkylammonium. The ionic liquid containing ones selected from these anions and cations can form ionic bonds with the above-mentioned organic/metallic hybrid polymer. The ionic liquid constituting the composite may be one kind or plural kinds (the anion may be one kind or plural kinds, and the cation may be one kind or plural kinds).

More preferably, the ionic liquid has a melting point of room temperature or less. Therefore, since gelatinization of the polymer can be promoted in the production of an electrochromic device described later, it is easy to prepare the composite in the electrochromic device. More preferably, the ionic liquid has a melting point of 0° C. or less. Therefore, since the ionic liquid surely becomes a liquid at room temperature, the composite can be reliably prepared in the manufacture of the electrochromic device. The term room temperature is herein intended to mean a temperature range that is higher than 0° C. and lower than or equal to 50° C.

More preferably, the ionic liquid has a potential window ranging from a negative potential of at least −1 V vs Ag/Ag$^+$ or less to a positive potential of +2 V vs Ag/Ag$^+$ or more. Therefore, since the electrochemical stability of the ionic liquid is increased, the durability of the electrochromic device described later can be improved. More preferably, the ionic liquid has a potential window ranging from a negative potential of −3 V or less to a positive potential of +3 V or more. Therefore, since the electrochemical stability of the ionic liquid is further increased, the durability of the electrochromic device can be still further improved.

For example, 1-butyl-1-methylpyrrolidinium bis(trifluoromethylsulfonyl)imide, which is the ionic liquid used in examples, is preferable since it has a potential window ranging from a negative potential of −3 V vs Ag/Ag$^+$ or less to a positive potential of +2.4 V vs Ag/Ag$^+$ or more and has a melting point of −18° C. or less. Besides this, methyltrioctylammonium bis(trifluoromethylsulfonyl)imide, 1-ethyl-1-methylpyrrolidinium allyl sulfonate, 1-ethyl-1-methylimidazolium allyl sulfonate, or the like is available since it has a potential window ranging from a negative potential of −2 V vs Ag/Ag$^+$ or less to a positive potential of +2.5 V vs Ag/Ag$^+$ or more and has a melting point of −2° C. or less.

In the composite of the present invention, preferably, the organic/metallic hybrid polymer and the ionic liquid are contained such that the molar ratio of the ionic liquid to the repeating structural unit of the organic/metallic hybrid polymer (i.e. the ionic liquid/(the repeating structural unit of the organic/metallic hybrid polymer)) is 0.1 or more and 4.0 or less. When the ratio of the molar amounts is 0.1 or more, the ionic liquid is sufficiently present and the organic/metallic hybrid polymer can form the composite as a whole. When the molar ratio is 4.0 or less, an appropriate amount of the ionic liquid is present and the composite of the present invention can function well as an electrochromic material. More preferably, the molar ratio satisfies 0.5 or more and 3 or less. Therefore, the organic/metallic hybrid polymer can easily form ionic bonds with the ionic liquid, by which the composite of the present invention can be obtained.

The organic/metallic hybrid polymer is preferably represented by a general formula selected from the group consisting of general Formulae (I), (II), and (III). In one embodiment, the organic/metallic hybrid polymer may be a mixture thereof.

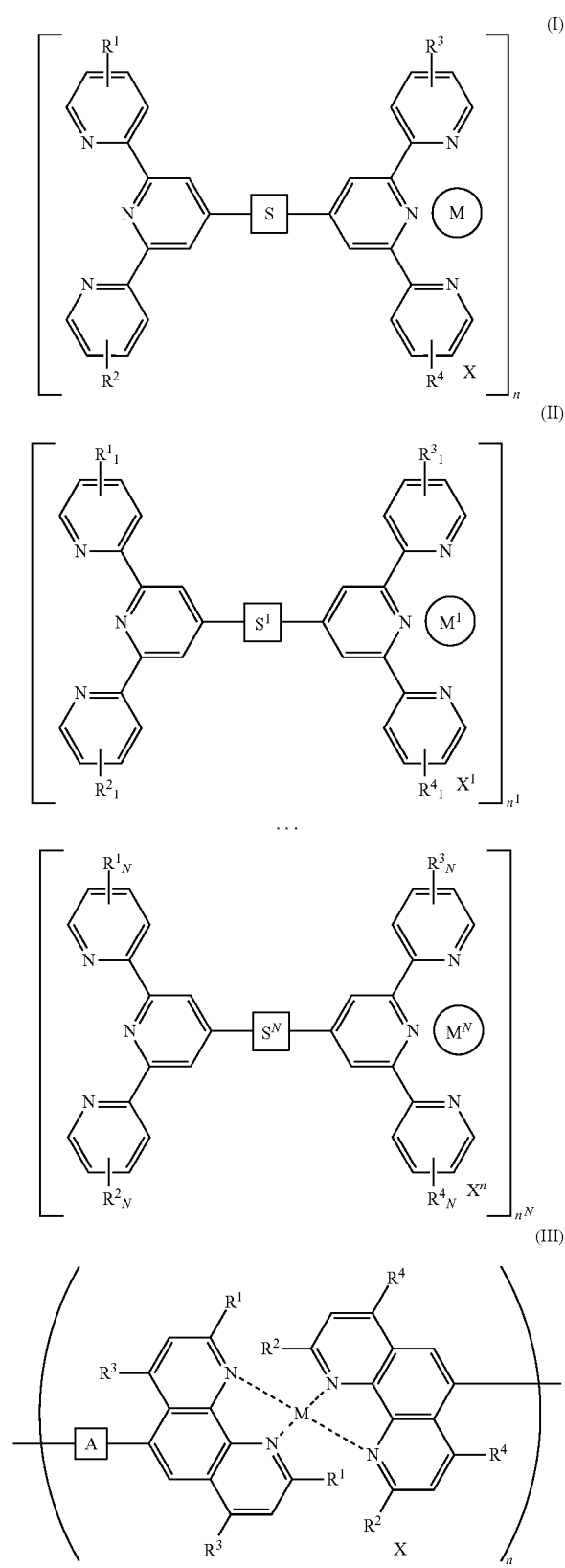

Each of the organic/metallic hybrid polymers represented by Formulae (I) and (II) contains a terpyridine group or a derivative thereof as the organic ligand and a metal ion coordinated thereto. The organic/metallic hybrid polymer represented by Formula (III) contains a phenanthroline group or a derivative thereof as the organic ligand and a metal ion coordinated thereto.

In Formula (I), M represents a metal ion, X represents a counter anion, S represents a spacer containing a carbon atom and a hydrogen atom or a spacer directly linking two terpyridine groups, $R^1$ to $R^4$ each independently represent a hydrogen atom or a substituent, and n is an integer of 2 or more which represents the degree of polymerization.

In Formula (II), $M^1$ to $M^N$ (N is an integer of 2 or more) each independently represent metal ions having different redox potentials, $X^1$ to $X^n$ (n is an integer of 2 or more) each independently represent a counter anion, $S^1$ to $S^N$ (N is an integer of 2 or more) each independently represent a spacer containing a carbon atom and a hydrogen atom or a spacer directly linking two terpyridine groups, $R^1_1$ to $R^1_N$, $R^2_1$ to $R^2_N$, $R^3_1$ to $R^3_N$, and $R^4_1$ to $R^4_N$ (N is an integer of 2 or more) each independently represent a hydrogen atom or a substituent, and $n_1$ to $n_N$ are each independently an integer of 2 or more which represents the degree of polymerization.

Here, the metal ions in Formula (I) and Formula (II) can be preferably a metal ion selected from the group consisting of Fe, Co, Ni, Zn, and Rh. Since these metal ions can take a hexacoordinate form, it is possible to form a complex with the organic ligand.

The counter anions in Formula (I) and Formula (II) can be selected from the group consisting of an acetate ion, a phosphate ion, a chloride ion, a phosphorous hexafluoride ion, a boron tetrafluoride ion, and a polyoxometalate. Due to these counter anions, the organic/metallic hybrid polymer becomes electrically neutral and stabilized.

When the spacers in Formula (I) and Formula (II) are a spacer containing a carbon atom and a hydrogen atom, such spacers can be a divalent organic group containing a carbon atom and a hydrogen atom. Examples thereof include an aliphatic hydrocarbon group, an alicyclic hydrocarbon group, an aromatic hydrocarbon group, and a heterocyclic group. Among them, an arylene group such as a phenylene group and a biphenylene group is preferable. In addition, these hydrocarbon groups may have a substituent such as an alkyl group such as a methyl group, an ethyl group, and a hexyl group, an alkoxy group such as a methoxy group and a butoxy group, and a halogen atom such as chlorine and bromine. In addition, such a spacer may further contain an oxygen atom or a sulfur atom. Since the oxygen atom or the sulfur atom has a modifying ability, the oxygen atom or the sulfur atom is advantageous for material design of the organic/metallic hybrid polymer.

Among the divalent arylene groups, the following arylene groups are preferable. In any of these cases, the organic/metallic hybrid polymer can be stabilized.

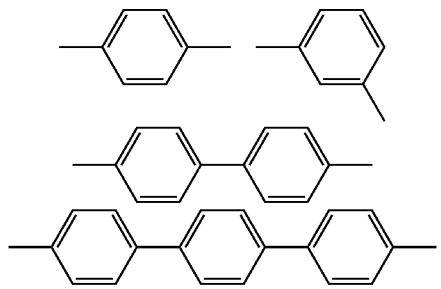

$x = 4, 6, 8, 10, 12, 14, 16, 18, 20$

Examples of the aliphatic hydrocarbon group constituting the spacer include an alkylene group such as $C_1$-$C_6$, specifically, a methylene group, an ethylene group, an n-propylene group, an i-propylene group, an n-butylene group, and a t-butylene group.

Furthermore, examples of the divalent organic group constituting the spacer may include ones having, as a substituent of these groups, a $C_1$-$C_6$ alkyl group such as a methyl group, an ethyl group, and a hexyl group, a $C_1$-$C_6$ alkoxy group such as a methoxy group and a butoxy group, and a halogen atom such as chlorine and bromine.

$R^1$ to $R^4$ in Formula (I) and $R^1_1$ to $R^1_N$, $R^2_1$ to $R^2_N$, $R^3_1$ to $R^3_N$, and $R^4_1$ to $R^4_N$ 41 in Formula (II) each independently represent a hydrogen atom or a substituent, and examples of the substituent include a halogen atom, a hydrocarbon group, a hydroxyl group, an alkoxy group (for example, $C_1$-$C_{10}$), a carbonyl group, a carboxylic ester group (for example, $C_1$-$C_{10}$), an amino group, a substituted amino group, an amide group, a substituted amide group, a cyano group, and a nitro group. Examples of the hydrocarbon group can include a linear or branched alkyl group such as $C_1$-$C_{10}$, specifically, a methyl group, an ethyl group, an n-propyl group, an i-propyl group, an n-butyl group, and a t-butyl group. Furthermore, examples of the substituent that these substituents of the hydrocarbon groups may have include, but not limited to, a $C_1$-$C_{10}$ alkyl group such as a methyl group, an ethyl group, and a hexyl group, a $C_1$-$C_{10}$ alkyl group such as a methoxy group and a butoxy group, and a halogen atom such as chlorine or bromine.

In Formula (I), n is an integer of 2 or more which represents the degree of polymerization, for example, 2 to 5,000, and preferably 10 to 1,000. In Formula (II), $n_1$ to $n_N$ are each independently an integer of 2 or more which represents the degree of polymerization, and the sum of $n_1+n_2 \ldots +n_N$ is, for example, 2 to 5,000, and preferably 10 to 1,000.

In Formula (III), M represents a metal ion, X represents a counter anion, A represents a spacer containing a carbon atom and a hydrogen atom or a spacer directly linking two phenanthroline groups, $R^1$ to $R^4$ each independently represent a hydrogen atom or a substituent, and n is an integer of 2 or more which represents the degree of polymerization.

Here, the metal ion in Formula (III) can be a metal ion selected from the group consisting of Pt, Cu, Ni, Ag, and Pd. Since these metal ions can take a tetracoordinate form, it is possible to form a complex with the organic ligand. The counter anion in Formula (III) can be selected from the group consisting of a perchlorate ion, a triflate ion, a boron tetrafluoride ion, a chloride ion, and a hexafluorophosphate ion. Due to these counter anions, the organic/metallic hybrid polymer becomes electrically neutral and stabilized.

When the spacer in Formula (III) is a spacer containing a carbon atom and a hydrogen atom, typical examples of the spacer include a phenyl group, a biphenyl group, a terphenyl group, a thienyl group, a bithienyl group, and a terthienyl group as illustrated below. In order to increase the solubility of the bis(phenanthroline) derivative, it is also preferable to use a spacer modified with an alkyl group ($C_1$-$C_{16}$) or an alkoxy group ($C_1$-$C_{16}$). Furthermore, it is also possible to use a spacer in which phenyl groups are linked through a dioxoalkyl group ($C_2$-$C_{16}$).

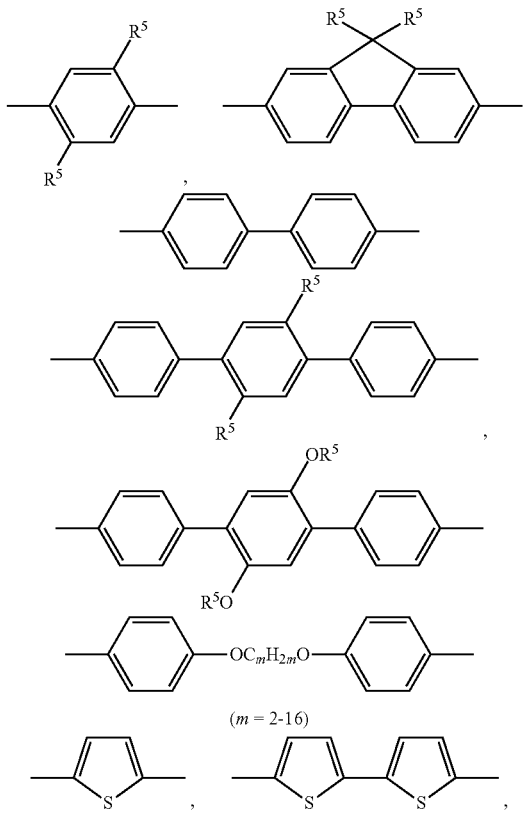

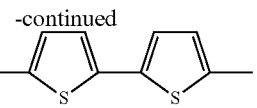

$R^5$ = H, $C_mH_{2m+1}$ (m = 1-16)

Examples of $R^1$ and $R^2$ in Formula (III) include hydrogen, a methyl group, a t-butyl group, a phenyl group, a thienyl group, a bithienyl group, and a terthienyl group as illustrated below. $R^3$ and $R^4$ in Formula (III) include hydrogen, a phenyl group, and a phenylacetyl group.

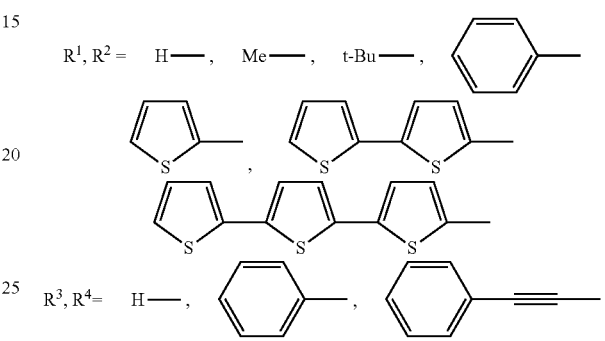

In Formula (III), n is an integer of 2 or more which represents the degree of polymerization, for example, 2 to 5,000, and preferably 10 to 1,000.

The composite of the present invention may be dissolved in a solvent selected from the group consisting of water, dimethylformamide, dimethylsulfoxide, ethanol, and methanol. Therefore, it can be visually confirmed that the composite of the present invention is actually obtained. For example, when the composite of the present invention contains an organic/metallic hybrid polymer, which contains a terpyridine group as the organic ligand and an Fe ion as the metal ion, and 1-butyl-1-methylpyrrolidinium bis(trifluoromethylsulfonyl)imide (BMP-TSI) as the ionic liquid, the composite of the present invention is dissolved in the above-mentioned solvent and exhibits a blue color, whereby the presence of the composite can be confirmed.

Since the composite of the present invention contains the organic/metallic hybrid polymer, it shows coloration based on charge transfer absorption from the metal ion to the organic ligand. That is, the composite of the present invention is in a decolored state in which coloration disappears when electrochemically oxidized, and becomes a colored state when electrochemically reduced. This phenomenon can be repeated. Therefore, the composite of the present invention functions as an electrochromic material.

Furthermore, since the composite of the present invention contains the ionic liquid forming ionic bonds with the organic/metallic hybrid polymer, the composite has excellent heat resistance due to the ionic liquid. Further, since the composite of the present invention contains the ionic liquid, it can promote the retention of the counter anion in response to a change in the valence of the metal ion in the organic/metallic hybrid polymer. Therefore, when the composite of the present invention is used in an electrochromic layer of an electrochromic device, it allows counter anions to quickly move from an adjacent electrolyte layer to the composite and be held in the composite, thereby improving response properties.

Next, a method for producing the composite of the present invention will be described.

The method for producing the composite of the present invention includes a step of contacting an organic/metallic hybrid polymer, which contains an organic ligand and a metal ion coordinated to the organic ligand, with an ionic liquid. Here, since preferred aspects of the organic/metallic hybrid polymer and the ionic liquid and preferable molar ratios thereof are as described above, the description thereof is omitted. Although the organic/metallic hybrid polymer is not particularly limited, an organic/metallic hybrid polymer synthesized with reference to, for example, Patent Literature 1 and Patent Literature 2 can be used.

In the present specification, "contact" has only to satisfy a situation in which the organic/metallic hybrid polymer and the ionic liquid come into physical contact with each other. For example, the organic/metallic hybrid polymer and the ionic liquid may be mixed, and when the organic/metallic hybrid polymer is in the form of a film, the film may be coated with the ionic liquid, or the ionic liquid may be dropped on the film, or the film may be immersed in the ionic liquid.

More preferably, the contacting step includes adding a solvent selected from the group consisting of water, dimethylformamide, dimethylsulfoxide, ethanol, and methanol to the organic/metallic hybrid polymer and the ionic liquid. Therefore, the organic/metallic hybrid polymer is dissolved in the solvent, and the formation of the ionic bonds with the ionic liquid can be promoted. The adjustment of the amounts or concentrations in the contact between the organic/metallic hybrid polymer and the ionic liquid is preferably performed such that the ratio of the molar amount of the ionic liquid to the molar amount for the repeating structural unit of the organic/metallic hybrid polymer in the obtained composite satisfies 0.1 or more and 4.0 or less. Usually, the contacting can be performed at room temperature under atmospheric pressure.

In this manner, since the composite according to the present invention is produced by simple contact, a special device is unnecessary, which is advantageous.

Embodiment 2

In Embodiment 2, an electrochromic device using the composite of the present invention described in Embodiment 1 as an electrochromic layer and a producing method thereof will be described in detail.

FIG. 1 is a schematic diagram illustrating a non-limiting Example of an electrochromic device according to Embodiment 2 of the present invention. The electrochromic device according to the present invention and the producing method thereof are not limited to this embodiment.

The electrochromic device 100 of FIG. 1 includes a first electrode 110, an electrochromic layer 120 disposed on the first electrode 110, an electrolyte layer 130 disposed on the electrochromic layer 120, and a second electrode 140 disposed on the electrolyte layer 130. Here, the electrochromic layer 120 contains the composite of the present invention described in Embodiment 1.

At least one of the first electrode 110 and the second electrode 140 is preferably any transparent electrode. As an electrode material, an ITO film that is a $SnO_2$ film, an $In_2O_3$ film, or a mixture of $In_2O_3$ and $SnO_2$ is preferable. The first electrode 110 and the second electrode 140 can be obtained by forming a transparent electrode material such as ITO on a resin substrate such as plastic or a transparent substrate such as a glass substrate by any type of physical vapor deposition or chemical vapor deposition process.

The electrochromic layer 120 contains the composite of the present invention described in Embodiment 1. Since the composite of the present invention is as described above, the description thereof is omitted. The electrochromic layer 120 may be made of only the composite of the present invention. Alternatively, the electrochromic layer 120 may include, in addition to the composite of the present invention, an organic/metallic hybrid polymer or the like that is not composited with an ionic liquid.

The electrolyte layer 130 usually contains at least a polymer and a supporting salt. Preferably, the electrolyte layer 130 contains at least one plasticizer selected from the group consisting of propylene carbonate (PC), ethylene carbonate, dimethyl carbonate, diethylene carbonate, γ-butyrolactone, succinonitrile, and an ionic liquid. Here, similarly to the ionic liquid contained in the composite of the present invention, the ionic liquid preferably contains at least one combination of an anion selected from the group consisting of tetrafluoroborate, hexafluorophosphate, bis(trifluoromethanesulfonyl)imide, and bis(pentafluoroethylsulfonyl)imide and a cation selected from the group consisting of imidazolium, pyrrolidinium, and tetraalkylammonium. Accordingly, the plasticizer and the supporting salt mentioned above are present in a polymer network, and a gel electrolyte layer can be formed, so that a flexible electrochromic device can be provided.

More preferably, the electrolyte layer 130 is prepared by dissolving the polymer and the supporting salt mentioned above in at least one solvent selected from the group consisting of acetonitrile, acetone, and tetrahydrofuran, performing casting, and removing the solvent. As a consequence of such a preparation process, the gel electrolyte layer in which the polymer, the plasticizer, and the supporting salt are uniformly dispersed can be constituted, leading to improvement and stabilization in properties of the electrochromic device.

The polymer is preferably at least one selected from the group consisting of poly(methyl methacrylate) (PMMA), polyethylene oxide (PEO), poly(vinylidene fluoride-co-hexafluoroisopropyl) (PVdF-co-PHFP), polypropylene carbonate (PPC), polycarbonate, and polyacrylonitrile. These polymers are advantageous in the construction of the gel electrolyte layer.

The supporting salt is preferably at least one selected from the group consisting of $LiClO_4$, $LiBF_4$, $LiAsF_6$, $LiPF_6$, $LiCF_3SO_3$, $LiCF_3COO$, lithium bis(trifluoromethanesulfonyl)imide (LiTFSI), $LiCH_3COO$, tetrabutylammonium perchlorate, tetraethylammonium perchlorate, KCl, $NaClO_3$, NaCl, $NaBF_4$, NaSCN, $KBF_4$, $Mg(ClO_4)_2$, and $Mg(BF_4)_2$. These supporting salts effectively function as the counter anion of the organic/metallic hybrid polymer in the composite of the present invention.

The electrolyte layer 130 may further contain an ion accumulation material that is at least one selected from the group consisting of viologen, N,N,N',N'-tetramethyl-p-phenylenediamine, and an organometallic complex. Therefore, since charge accumulation between the first electrode 110 and the electrochromic layer 120 can be controlled, a physical damage to the first electrode 110 resulting from the charge accumulation can be suppressed. Examples of the organometallic complex include ferrocene, Prussian blue, and porphyrin. Although the composite per se of the present invention constituting the electrochromic layer 120 can also suppress the charge accumulation, if the above-mentioned ion accumulation material is further included, it is possible to more effectively prevent a damage to the first electrode 110 and the substrate having the same.

The electrochromic device 100 of the present invention may be sealed with a sealant containing an epoxy resin and/or a silicone resin. This improves the barrier properties of the electrochromic device 100 to oxygen and water.

The electrochromic device 100 of the present invention operates as follows. The first electrode 110 and the second electrode 140 are connected to a power supply (not illustrated in the drawing), and a predetermined voltage is applied to the electrochromic layer 120 and the electrolyte layer 130. This operation allows the redox of the electrochromic layer 120 to be controlled. That is, the redox of the metal ion of the organic/metallic hybrid polymer in the composite of the present invention constituting the electrochromic layer 120 can be controlled, and it is possible to exhibit coloring and decoloring.

Here, since the electrochromic layer 120 contains the composite of the present invention, the electrochromic layer 120 has excellent heat resistance due to the ionic liquid that forms the ionic bonds with the organic/metallic hybrid polymer. As a result, the electrochromic device 100 of the present invention can be used at high temperatures, and stable electrochromic properties can be exhibited even by repeated driving.

Further, since the electrochromic layer 120 contains the composite of the present invention, when the valence of the metal ion in the organic/metallic hybrid polymer contained in the composite is changed by application of voltage, the counter anion by the supporting salt from the adjacent electrolyte layers 130 can be quickly transferred to the electrochromic layer 120 via the ionic liquid and held in the composite constituting the electrochromic layer 120. Consequently, since charge compensation of the valence of the metal ion by redox can be performed using the counter anion by the supporting salt held in the composite, quick response properties can be achieved.

A plurality of electrochromic devices 100 of the present invention may be combined and arranged in a matrix form.

Next, a method for producing the electrochromic device 100 of the present invention will be described.

Figure 2:
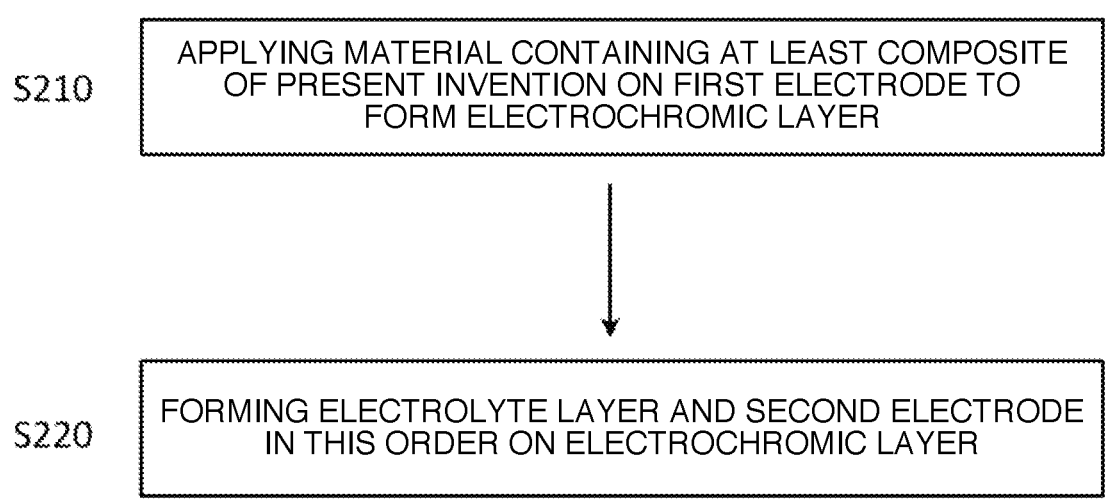
FIG. 2 is a flowchart illustrating a process of producing an electrochromic device of the present invention.

FIG. 2 is a flowchart illustrating a process of producing an electrochromic device of the present invention.

Step S210:

A material containing at least the composite of the present invention described in Embodiment 1 is applied on a first electrode 110 (FIG. 1) to form an electrochromic layer 120 (FIG. 1). The application is not limited as long as the electrochromic layer 120 is formed on the first electrode 110. However, when the material containing the composite of the present invention is a liquid, the application may be, for example, a means such as coating, immersion, or spraying. For example, the application is performed such that the thickness of the electrochromic layer 120 (thickness after solvent drying in the case of using a solvent) is in the range of 10 nm or more and 10 µm or less. Within this range, a sufficient amount of the composite is contained in the electrochromic layer 120, thereby exhibiting high electrochromic properties.

Step S220:

An electrolyte layer 130 (FIG. 1) and a second electrode 140 (FIG. 1) are formed in this order on the electrochromic layer 120 (FIG. 1) formed in step S210. The electrolyte layer 130 may be formed by applying a material constituting the electrolyte layer 130 on the electrochromic layer 120. The application can use, for example, a means such as coating, immersion, spraying, or electrolytic polymerization, and is performed such that the thickness (thickness after solvent drying in the case of using a solvent) is in the range of 10 nm or more and 10 mm or less. Here, the material constituting the electrolyte layer 130 is a material that does not dissolve the composite contained in the electrochromic layer 120. When the material constituting the electrolyte layer 130 contains at least a polymer, a supporting salt, and a solvent, the weight ratio thereof may be, for example, 4 to 10:1 to 6:30 to 250. Further, for example, in a case where the second electrode 140 is formed on another substrate, the second electrode 140 may be formed by bonding the second electrode 140 formed on another substrate to a structure made of the first electrode 110, the electrochromic layer 120, and the electrolyte layer 130.

In step S210, in preparing a film (electrochromic layer 120) containing the composite of the present invention, as described above, the organic/metallic hybrid polymer and the ionic liquid may be brought into contact and dissolved in a solvent such as methanol, and it may be then coated, which may be followed by stripping off the solvent such as methanol. Alternatively, the film containing the composite may be formed by impregnating an ionic liquid with a film containing an organic/metallic hybrid polymer. However, when producing an electrochromic device, the film containing the organic/metallic hybrid polymer or the composite should not dissolve into the electrolyte layer. Therefore, as described above, the material constituting the electrolyte layer 130 may be a material that does not dissolve the composite contained in the electrochromic layer 120, may use acetonitrile or the like in which the composite or the like is hardly dissolved, or may be bonded to the electrochromic layer by previously solidifying the electrolyte layer on the second electrode 140.

Subsequently to step S210 or step S220, an excess solvent may be removed by leaving at room temperature for a predetermined period of time. This improves the electrochromic properties of the electrochromic device 100.

As such, since the electrochromic device 100 according to the present invention can be produced only by applying the material containing the composite of the present invention as the electrochromic layer 120, a special device is unnecessary, which is advantageous.

Figure 3:
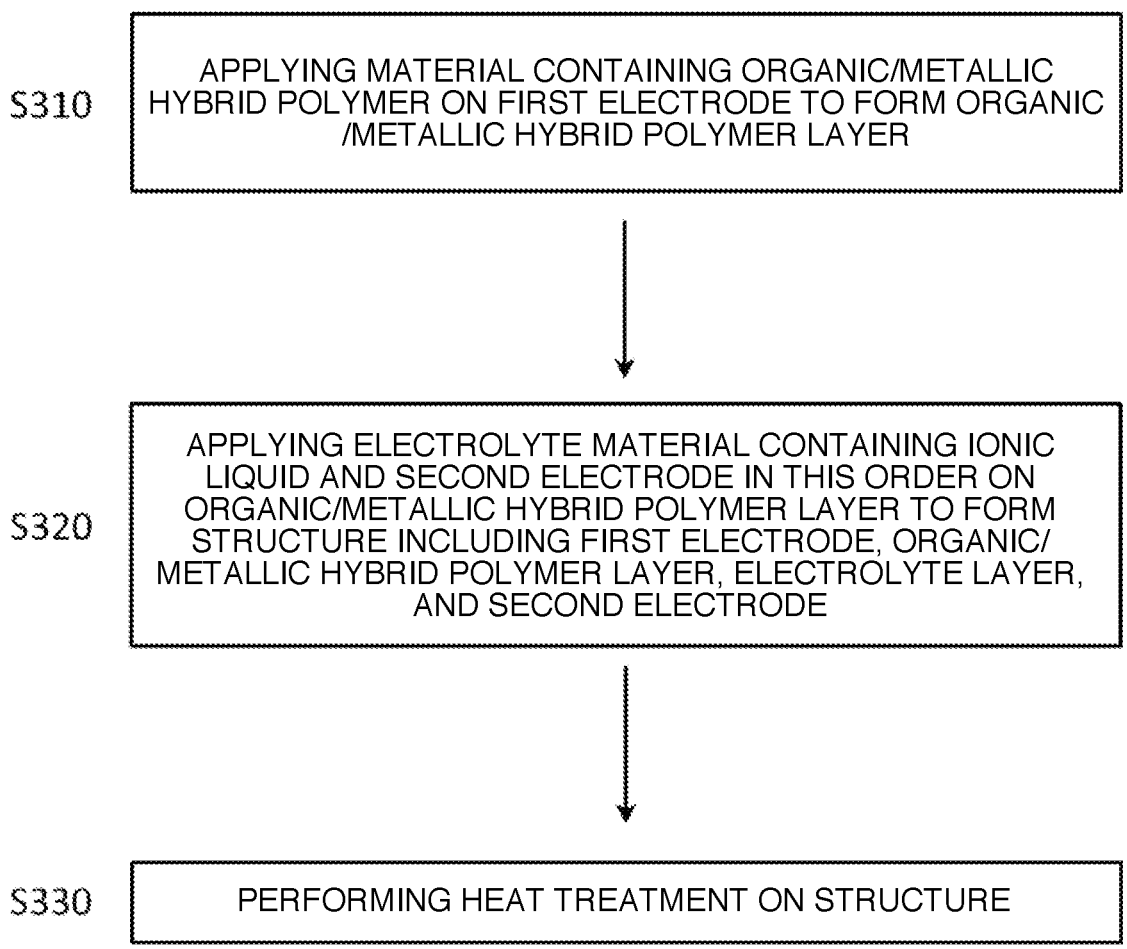
FIG. 3 is a flowchart illustrating another process of producing an electrochromic device of the present invention.

FIG. 3 is a flowchart illustrating another process of producing an electrochromic device of the present invention.

Step S310:

A material containing an organic/metallic hybrid polymer containing an organic ligand and a metal ion coordinated to the organic ligand is applied on the first electrode 110 (FIG. 1) to form an organic/metallic hybrid polymer layer. Here, since the organic/metallic hybrid polymer is the organic/metallic hybrid polymer described with reference to Embodiment 1, the description thereof is omitted. The material containing the organic/metallic hybrid polymer is preferably prepared by dissolving the organic/metallic hybrid polymer in a solvent selected from the group consisting of water, dimethylformamide, dimethylsulfoxide, ethanol, and methanol. The application to the first electrode 110 is made easier by such a process. Here, the application can use a means such as coating, immersion, or spraying, and is performed such that the thickness (thickness after solvent drying in the case of using a solvent) is in the range of 10 nm or more and 10 µm or less.

Step S320:

An electrolyte material containing an ionic liquid and a second electrode are applied in this order on the organic/metallic hybrid polymer layer formed in step S310 to form a structure including the first electrode, the organic/metallic hybrid polymer layer, the electrolyte layer, and the second electrode.

The electrolyte material containing the ionic liquid may contain an ionic liquid in a material constituting a so-called gel electrolyte layer. At least part of the ionic liquid contained therein forms ionic bonds with the organic/metallic hybrid polymer of the organic/metallic hybrid polymer layer formed in step S310, thereby making the composite of the present invention. Therefore, preferably, the ionic liquid is the ionic liquid described in Embodiment 1. Furthermore, some ionic liquids may serve to disperse a supporting salt described later as a plasticizer.

More preferably, the electrolyte material containing the ionic liquid contains, in addition to the ionic liquid, a polymer and a supporting salt. More preferably, the electrolyte material containing the ionic liquid further contains a solvent selected from the group consisting of acetonitrile, acetone, and tetrahydrofuran. Since these solvents hardly dissolve the composite of the present invention and the organic/metallic hybrid polymer, an electrolyte layer 130 (FIG. 1) that is a gel electrolyte layer is formed. Since the polymer and the supporting salt are similar to the polymer and the supporting salt described with reference to FIG. 1, the description thereof is omitted.

Here, preferably, the electrolyte material containing the ionic liquid may further contain an ion accumulation material selected from the group consisting of viologen, N,N,N', N'-tetramethyl-p-phenylenediamine and an organometallic complex. Because of the presence of the ion accumulation material, in step S330 described later, the electrolyte layer 130 (FIG. 1) for suppressing charge accumulation between the first electrode 110 and the electrochromic layer 120 is obtained. Since the organometallic complex is similar to the organometallic complex described with reference to FIG. 1, the description thereof is omitted. Preferably, the ion accumulation material is contained in an electrolyte material containing an ionic liquid in an amount ranging from 5 mM to 15 mM. Within this range, charge accumulation can be reliably suppressed.

Preferably, the electrolyte material containing the ionic liquid further contains a plasticizer selected from the group consisting of propylene carbonate (PC), ethylene carbonate, dimethyl carbonate, diethyl carbonate, γ-butyrolactone, and succinonitrile. Due to the plasticizer, in step S330 described later, the electrolyte layer 130 (FIG. 1) that is a gel electrolyte layer in which the supporting salt is well dispersed can be obtained.

When the electrolyte material containing the ionic liquid contains at least a polymer, a supporting salt, an ionic liquid, and a solvent, the polymer, the supporting salt, the ionic liquid, and the solvent preferably satisfy the weight ratio of 4 to 10:1 to 6:10 to 30:50 to 250. Having such a ratio in step S330 described later, the electrochromic layer 120 containing the composite of the present invention and the electrolyte layer 130 can be formed.

For example, in a case where the second electrode 140 is formed on another substrate, the arrangement of the second electrode 140 may be performed by bonding the second electrode 140 formed on another substrate to a structure including the first electrode 110, the electrochromic layer 120, and the electrolyte layer 130.

Step S330:

The structure formed in step S320 is heat-treated. Accordingly, at least part of the ionic liquid moves from the electrolyte layer made of the electrolyte material containing the ionic liquid to the organic/metallic hybrid polymer layer, and the ionic liquid and the organic/metallic hybrid polymer in the organic/metallic hybrid polymer layer form ionic bonds. As a result, the electrochromic layer 120 containing the composite of the present invention is obtained. Usually, after the heat treatment, the thickness of the electrochromic layer 120 may be 10 nm or more and 10 μm or less, and the thickness of the electrolyte layer 130 may be 10 nm or more and 10 μm or less.

The heat treatment preferably includes heating the structure formed in step S320 in a temperature range that is higher than 50° C. and lower than 200° C. Within this temperature range, the formation of the ionic bonds can be promoted and the composite of the present invention is obtained. More preferably, in the heat treatment, the temperature range is set to 75° C. or higher and 150° C. or lower. Within this range, it is possible to obtain the electrochromic layer 120 containing the composite of the present invention by promoting the formation of the ionic bonds while removing an unnecessary solvent of the entire electrochromic device.

The heat treatment is preferably performed for 30 minutes or more and 24 hours or less. When the heat treatment time is 30 minutes or more, the ionic liquid sufficiently migrates to the organic/metallic hybrid polymer layer, and the ionic bonds are reliably formed. Since the heat treatment time is 24 hours or less, waste of energy after the completion of the reaction is prevented. The heat treatment time is more preferably 30 minutes or more and 5 hours or less. Within this range, it is advantageous since the electrochromic layer 120 containing the composite of the present invention can be obtained in a relatively short time.

The heat treatment is preferably performed by heating the structure formed in step S320 in the atmosphere or in an environment in which a relative humidity is 80% or more. If heat treatment is performed in these environments, the electrochromic layer 120 containing the composite of the present invention can be obtained.

A part of the ionic liquid may remain in the electrolyte layer. Due to this, since the ionic conductivity of the electrolyte is improved, high electrochromic properties with excellent durability can be exhibited.

Subsequently to step S310, step S320, or step S330, an excess solvent may be removed by leaving at room temperature for a predetermined time. This improves the electrochromic properties of the electrochromic device 100.

The method for producing the electrochromic device 100 of the present invention, illustrated in FIG. 3, is advantageous since the electrochromic device 100 can be produced by forming the electrochromic layer 120 containing the composite of the present invention in step S330.

So far, the method for producing the electrochromic device 100 in which the material constituting the electrolyte layer 130 does not dissolve the composite of the present invention or the organic/metallic hybrid polymer has been described. Even if the material constituting the electrolyte layer 130 dissolves the composite of the present invention or the organic/metallic hybrid polymer, the electrochromic device 100 of the present invention can be produced. Details are as follows.

Step S410:

An electrochromic layer 120 is formed on a first electrode 110. This step S410 is similar to step S210.

Step S420:

An electrolyte layer 130 is formed on a second electrode 140. The electrolyte layer 130 may be heated and solidified (solvent-removed) after casting the material constituting the electrolyte layer 130. The second electrode and the electrolyte layer in this step are similar to those described in step S220.

Step S430:

The first electrode 110 on which the electrochromic layer 120 obtained in step S410 is formed and the second electrode 140 on which the electrolyte layer 130 obtained in step S420 is formed are bonded to each other such that the electrochromic layer 120 and the electrolyte layer 130 are brought into contact with each other.

The present invention will be described in detail with reference to specific examples, but it should be noted that the present invention is not limited to these examples.

EXAMPLES

Material

Materials used in the following examples will be described. All the materials were special grade reagents and were used without purification. Poly(methyl methacrylate) (PMMA, weight average molecular weight=350 kg/mol) and a glass substrate coated with indium tin oxide (ITO) (hereinafter referred to as an ITO substrate for simplicity, resistivity=8 to 12 $\Omega/cm^2$) were purchased from Sigma-Aldrich Co. LLC.

Methanol (MeOH), acetonitrile (ACN), polycarbonate, poly(ethylene oxide) (PEO, weight average molecular weight=4000 kg/mol), 1-butyl-1-methylpyrrolidinium bis(trifluoromethylsulfonyl)imide (hereinafter referred to as BMP-TFSI for simplicity), 1-butyl-3-methylimidazolium tetrafluoroborate (hereinafter referred to as $BMIm-BF_4$ for simplicity), and 1-butyl-1-methylpyrrolidinium hexafluorophosphate (hereafter $BMP-PF_6$ for simplicity) were purchased from Wako Pure Chemical Industries, Ltd.

Lithium perchlorate ($LiClO_4$) was purchased from Kanto Chemical Co., Ltd. Viologen (N,N'-dioctyl-4,4'-bipyridinium tetrafluoroborate) was synthesized according to S. Fukuzumi et al. J. Am. Chem. Soc., 2001, 123, 2571 and U.S. Pat. No. 5,294,376.

As an organic/metallic hybrid polymer, a polymer material represented by Formula (A) (hereinafter referred to as Fe-MEPE for simplicity) was used. Fe-MEPE was prepared by NARD Research Institute Inc. with reference to Patent Literature 1 or F. S. Han et al. J. Am. Chem. Soc., 2008, 130(6), pp. 2073-2081. In Formula (A), the organic ligand was a terpyridine group, the metal ion was an iron (Fe) ion, and the counter anion was an acetate ion.

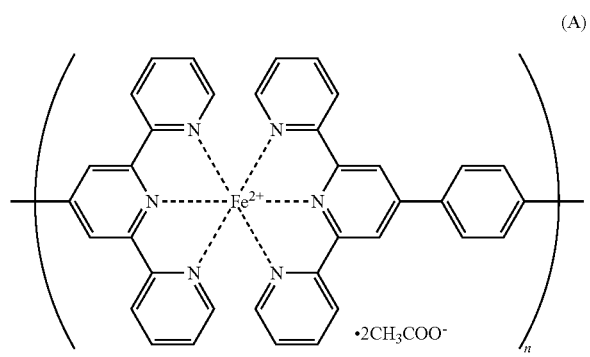

(A)

Example 1

In Example 1, a composite containing Fe-MEPE represented by Formula (A) as an organic/metallic hybrid polymer and BMP-TFSI as an ionic liquid was synthesized.

Fe-MEPE and an excess of BMP-TFSI (>10 equivalents) were mixed in methanol. Here, the molar ratio of BMP-TFSI to the repeating structural unit of Fe-MEPE was 0.1 or more and 4.0 or less. It was confirmed by visual observation that Fe-MEPE changed from violet to blue after the mixing. From this, it was confirmed that the ionic bonds were formed between Fe-MEPE and BMP-TFSI by merely bringing Fe-MEPE and BMP-TFSI into contact (in this case, mixing), and the composite of the present invention was obtained.

Example 2

In Example 2, an electrochromic device including an electrochromic layer containing the composite of the present invention (containing Fe-MEPE and BMP-TFSI) was produced by a process including heat treatment at predetermined conditions, i.e., at 100° C., for 3 hours, and at a relative humidity >85%; at 150° C. for 3 hours at a relative humidity >85%; at 150° C. for 3 hours in the atmosphere (at a relative humidity of 50%).

Details will be described. A material containing Fe-MEPE as an organic/metallic hybrid polymer was applied on an ITO substrate as a first electrode 110 (FIG. 1) to form an organic/metallic hybrid polymer layer (step S310 in FIG. 3). The material containing Fe-MEPE was prepared by dissolving Fe-MEPE (4 g) in MeOH (1 mL), performing filtering through a syringe filter (polyvinylidene fluoride (PVDF), 0.45 µm), and removing an insoluble residue. The obtained material containing Fe-MEPE (4 mL) was applied on an ITO substrate (2.5×2.5 cm) by spray coating. In this manner, a smooth and uniform organic/metallic hybrid polymer layer was obtained.

Next, an electrolyte material containing an ionic liquid and a second electrode 140 (FIG. 1) were applied in this order on the organic/metallic hybrid polymer layer to form a structure including the first electrode 110, the organic/metallic hybrid polymer layer, the electrolyte layer, and the second electrode 140 (step S320 in FIG. 3).

Here, the electrolyte material containing the ionic liquid was prepared as follows. $LiClO_4$ and BMP-TFSI as the ionic liquid were dissolved in ACN, and PMMA was added thereto and stirred vigorously until PMMA was completely dissolved. The electrolyte material containing the ionic liquid thus obtained was a colorless, transparent, semi-gel viscous liquid. The weight ratio of PMMA, $LiClO_4$, BMP-TFSI, and ACN was 7:3:20:70.

The prepared electrolyte material containing the ionic liquid was applied on the organic/metallic hybrid polymer layer obtained in step S310 by drop casting to form an electrolyte layer. The electrolyte layer was then covered with an ITO substrate as a second electrode 140 to obtain a structure including the first electrode 110, the organic/metallic hybrid polymer layer, the electrolyte layer, and the second electrode 140. The structure was left at room temperature for 72 hours to remove an unnecessary solvent.

The structure was heat-treated under the conditions of 100° C. for 3 hours at a relative humidity >85%; 150° C. for 3 hours at a relative humidity >85%; and 150° C. for 3 hours in the atmosphere (at a relative humidity of 50%), respectively, and an unnecessary solvent was then removed (step S330 in FIG. 3). The heat treatment was performed by using a vacuum oven (EYELA, VOS-201SD). The production conditions of the electrochromic device described above are shown in Table 1 and Table 2. The thickness of the electrolyte layer in this device was about 0.2 to 0.4 mm, and the thickness of the polymer layer (measured by a stylus profilometer) was about 400 nm.

The electrochromic properties of the obtained electrochromic device were evaluated at room temperature. The optical properties and electrochromic color change of the electrochromic device were measured by UV-vis absorption spectroscopy. For measurement, an Ocean Optics's DH-2000-BAL UV-vis-NIR light source and a USB4000 detection system were used. Cyclic voltammetry (CV) and current measurement (AM) of the electrochromic device were performed by an electrochemical analyzer (BAS Inc., ALS/CH Instruments Electrochemical Analyzer model 612B). The above-described apparatus was used to examine the electrochromic properties (change in transmittance, decoloring/coloring time, contrast ratio, repetitive driving stability, and the like) when the redox was repeated 100 times with respect to the electrochromic device after each heat treatment of Example 2. The results are shown in FIGS. 4A, 4B, 4C and 4D and Table 3.

In order to examine the heat resistance of the electrochromic device of Example 2, the electrochromic device was held in a chamber set to a temperature of 80° C. and a relative humidity of 35%, and the damage degree and electrochromic properties of the device were observed when the redox was repeated 100 times. The results are shown in Table 4.

Example 3

In Example 3, an electrochromic device was produced in the same manner as in Example 2, except that heat treatment was performed at a temperature of 50° C. or less and a relative humidity >85% for 3 hours, and then at a temperature of 200° C. and a relative humidity >85% for 3 hours. Similarly to Example 2, the electrochromic properties and heat resistance of the electrochromic device of Example 3 when the redox was repeated 100 times were examined. The results are shown in FIGS. 4A, 4B, 4C and 4D, Table 3, and Table 4.

Example 4

Figure 5:
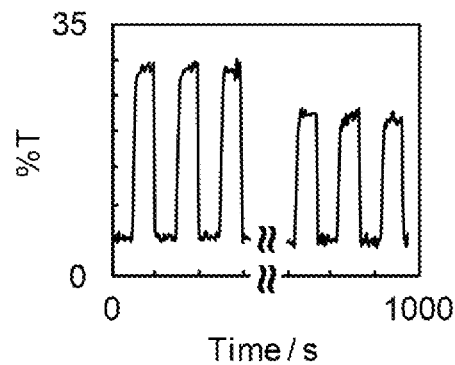
FIG. 5 is a diagram illustrating a change in transmittance at a wavelength of 580 nm when redox of an electrochromic device of Example 4 was repeated.

In Example 4, an electrochromic device was produced in the same manner as in Example 3, except that propylene carbonate (PC) was used as a plasticizer instead of the ionic liquid. However, heat treatment was performed only under conditions of a temperature of 50° C. or less, a relative humidity >85%, and 3 hours. The weight ratio of PMMA, LiClO$_4$, PC, and ACN was 8:3:27:63. Similarly to Example 2, the electrochromic properties and heat resistance of the electrochromic device of Example 4 when the redox was repeated 100 times were examined. The results are shown in FIG. 5, Table 3, and Table 4.

While a 10% weight decay temperature ($T_{d10}$) of the electrolyte material containing the ionic liquid obtained in Example 3 by TGA was 309° C., a 10% weight decay temperature ($T_{d10}$) of the electrolyte material containing propylene carbonate obtained in Example 4 by TGA was 124° C. It should be noted that the former was higher by over 150° C.

Example 5

Figure 6A:
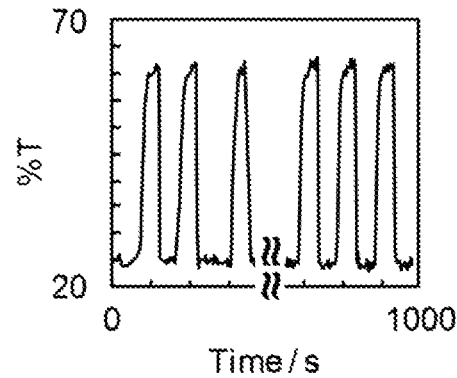
FIGS. 6A and 6B are diagrams illustrating changes in transmittance at a wavelength of 580 nm when redox of electrochromic devices of Example 5 and Example 6 was repeated.
Figure 6B:
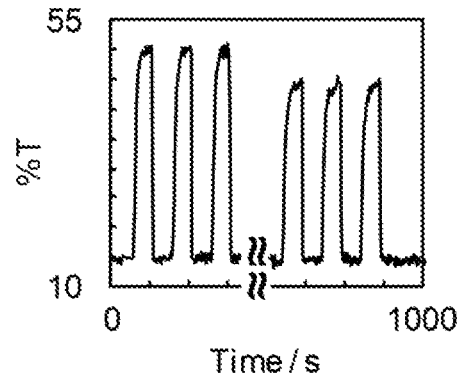

In Example 5, an electrochromic device was produced in the same manner as in Example 2, except that the polymer contained in the electrolyte was replaced with poly(ethylene oxide) (PEO). However, heat treatment was performed at 100° C. for 3 hours at a relative humidity >85%, and then at 150° C. for 3 hours at a relative humidity >85%. The weight ratio of PEO, LiClO$_4$, BMP-TFSI, and ACN was 7:3:20:210. Similarly to Example 2, the electrochromic properties of the electrochromic device of Example 5 when the redox was repeated 100 times were examined. The results are shown in FIGS. 6A and 6B and Table 3.

Example 6

In Example 6, an electrochromic device was produced in the same manner as in Example 5, except that heat treatment was performed at a temperature of 50° C. or less and a relative humidity >85%. Similarly to Example 2, the electrochromic properties of the electrochromic device of Example 6 when the redox was repeated 100 times were examined. The results are shown in FIGS. 6A and 6B and Table 3.

Example 7

In Example 7, an electrochromic device was produced in the same manner as in Example 5 and Example 6, except that propylene carbonate (PC) was used as a plasticizer instead of the ionic liquid. The weight ratio of PEO, LiClO$_4$, PC, and ACN was 7:3:20:210. Heat treatment was performed at 50° C. and a relative humidity of 50% (in the atmosphere) for 3 hours. Similarly to Example 2, the electrochromic properties of the electrochromic device of Example 7 when the redox was repeated 100 times were examined. The results are shown in Table 3.

While a 10% weight decay temperature ($T_{d10}$) of the electrolyte material containing the ionic liquid obtained in Example 6 by TGA was 362° C., a 10% weight decay temperature ($T_{d10}$) of the electrolyte material containing propylene carbonate obtained in Example 7 by TGA was 137° C. It should be noted that the former was higher by over 200° C.

Example 8

In Example 8, an electrochromic device was produced in the same manner as in Example 2, except that viologen (10 mM) was used as an ion accumulation material in an electrolyte (that is, viologen was added to the electrolyte material containing the ionic liquid in Example 2). Heat treatment was performed at a temperature of higher than 50° C. and a relative humidity of 50% (in the atmosphere) for 3 hours. Similarly to Example 2, the electrochromic properties and heat resistance of the electrochromic device of Example 8 when the redox was repeated 100 times were examined. The results are shown in Table 4.

Example 9

In Example 9, an electrochromic device was produced in the same manner as in Example 4, except that viologen (10 mM) was further used as an ion accumulation material in an electrolyte. Heat treatment was performed at a temperature of higher than 50° C. and a relative humidity of 50% (in the atmosphere) for 3 hours. Similarly to Example 2, the electrochromic properties and heat resistance of the electrochromic device of Example 9 when the redox was repeated 100 times were examined. The results are shown in Table 4.

Example 10

In Example 10, an electrochromic device was produced in the same manner as in Example 2, except that BMIm-BF$_4$ was used as an ionic liquid. A potential window (4.6 V) of BMIm-BF$_4$ was narrower than a potential window (5.5 V) of BMP-TFSI. The weight ratio of PMMA, LiClO$_4$, BMIm-BF$_4$, and ACN was 7:3:20:70. Heat treatment was performed at a temperature of higher than 50° C. and a relative humidity of 50% (in the atmosphere) for 3 hours. Similarly to Example 2, the electrochromic properties of the electrochromic device of Example 10 when the redox was repeated 100 times were examined. The results are shown in Table 3.

Example 11

In Example 11, an electrochromic device was produced in the same manner as in Example 5, except that BMIm-BF$_4$ was used as an ionic liquid. The weight ratio of PEO, LiClO$_4$, BMIm-BF$_4$, and ACN was 7:3:20:210. Heat treatment was performed at a temperature of higher than 50° C. and a relative humidity of 50% (in the atmosphere) for 3 hours. Similarly to Example 2, the electrochromic properties of the electrochromic device of Example 11 when the redox was repeated 100 times were examined. The results are shown in Table 3.

Example 12

In Example 12, an electrochromic device was produced in the same manner as in Example 2, except that BMP-PF$_6$ which is a solid at ordinary temperatures was used as an ionic liquid. BMP-PF$_6$ has a melting point higher than room temperature and was a solid at 25° C. The weight ratio of PMMA, LiClO$_4$, BMP-PF$_6$, and ACN was 7:3:20:70. An electrolyte material containing an ionic liquid was prepared, but gelation did not occur. Furthermore, the electrolyte material containing the ionic liquid was applied on the organic/metallic hybrid polymer layer, but adhesion could not be obtained. Therefore, even if a further process (heat treatment) was performed, it did not function as an electrochromic device, and thus the production was given up. From this, it has been shown that the ionic liquid contained in the composite of the present invention preferably had a melting point of room temperature or less and more preferably had a melting point of 0° C. or less.

The experimental conditions of Examples 2 to 12 above are shown in Table 1 and Table 2 for simplicity. First, the electrochromic properties of the electrochromic devices of Examples 2 to 11 will be described.

TABLE 2

List of heat treatment conditions for structures formed in Examples 2 to 11

| Example No. | Heat Treatment Temperature (° C.) | Humidity (%) | Time (h) |
| --- | --- | --- | --- |
| Example 2 | 100 | >85 | 3 |
|  | 150 | >85 | 3 |
|  | 150 | 50 | 3 |
| Example 3 | 50 | >85 | 3 |
|  | 200 | >85 | 3 |
| Example 4 | 50 | >85 | 3 |
| Example 5 | 100 | >85 | 3 |
|  | 150 | >85 | 3 |
| Example 6 | 50 | >85 | 3 |
| Example 7 | 50 | 50 | 3 |
| Example 8 | >50 | 50 | 3 |
| Example 9 | >50 | 50 | 3 |
| Example 10 | >50 | 50 | 3 |
| Example 11 | >50 | 50 | 3 |

FIGS. 4A, 4B, 4C and 4D are diagrams illustrating changes in transmittance at a wavelength of 580 nm when the redox of the electrochromic devices of Example 2 and Example 3 was repeated.

FIG. 5 is a diagram illustrating a change in transmittance at a wavelength of 580 nm when the redox of the electrochromic device of Example 4 was repeated.

FIGS. 6A and 6B are diagrams illustrating changes in transmittance at a wavelength of 580 nm when the redox of the electrochromic devices of Example 5 and Example 6 was repeated.

Figure 4A:
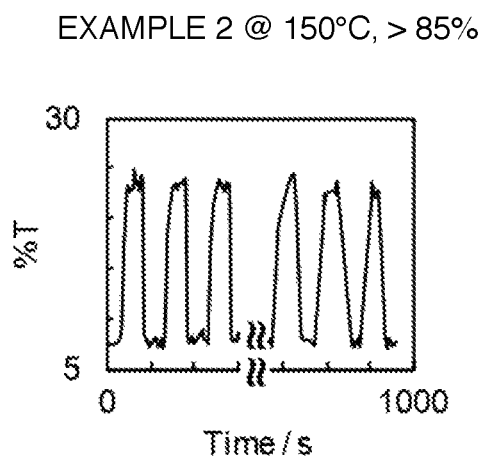
FIGS. 4A, 4B, 4C and 4D are diagrams illustrating changes in transmittance at a wavelength of 580 nm when redox of electrochromic devices of Example 2 and Example 3 was repeated.
Figure 4B:
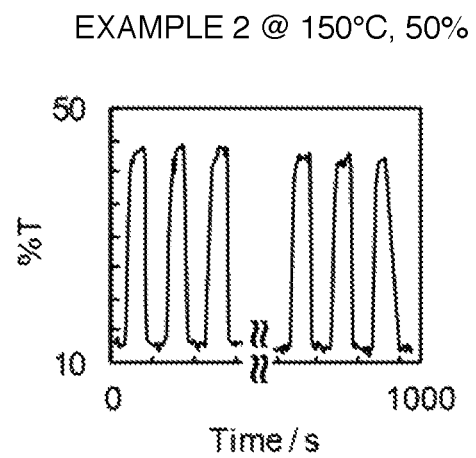
Figure 4C:
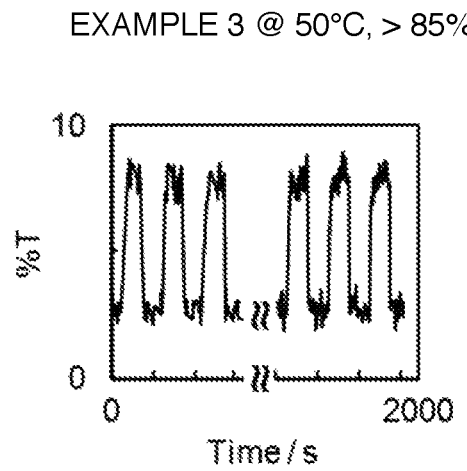

FIGS. 4A and 4B show the change in transmittance of the electrochromic device that was heat-treated at a temperature of 150° C. and a relative humidity >85% for 3 hours in Example 2 and the electrochromic device that was heat-treated at a temperature of 150° C. and a relative humidity of 50% for 3 hours in Example 2, respectively. FIG. 4C

TABLE 1

List of structures formed in Examples 2 to 12
(Numbers in parentheses without annotations indicate weight ratio)

Figure 4D:
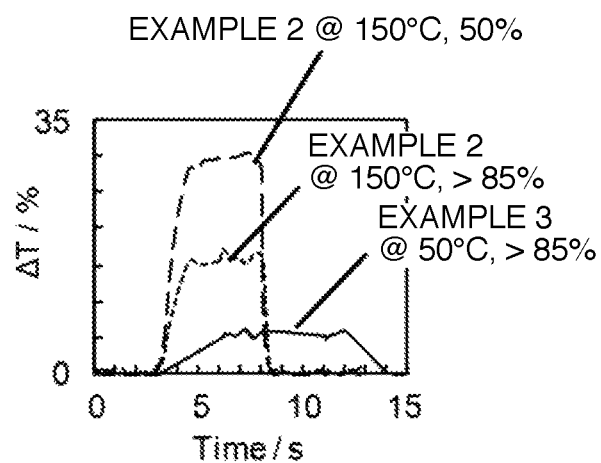

| Example No. | First and Second Electrodes | Organic/Metallic Hybrid Polymer Layer | Electrolyte Layer | | | | | Ion Accumulation Material (mM) |
| --- | --- | --- | --- | --- | --- | --- | --- | --- |
| | | | Polymer | Supporting Salt | Plasticizer | | Solvent | |
| | | | | | Ionic Liquid | Organic Solvent | | |
| Example 2 | ITO | Fe-MEPE | PMMA (7) | LiClO$_4$ (3) | BMP-TFSI (20) | — | ACN (70) | — |
| Example 3 | ITO | Fe-MEPE | PMMA (7) | LiClO$_4$ (3) | BMP-TFSI (20) | — | ACN (70) | — |
| Example 4 | ITO | Fe-MEPE | PMMA (8) | LiClO$_4$ (3) | — | PC (27) | ACN (63) | — |
| Example 5 | ITO | Fe-MEPE | PEO (7) | LiClO$_4$ (3) | BMP-TFSI (20) | — | ACN (210) | — |
| Example 6 | ITO | Fe-MEPE | PEO (7) | LiClO$_4$ (3) | BMP-TFSI (20) | — | ACN (210) | — |
| Example 7 | ITO | Fe-MEPE | PEO (7) | LiClO$_4$ (3) | — | PC (20) | ACN (210) | — |
| Example 8 | ITO | Fe-MEPE | PMMA (7) | LiClO$_4$ (3) | BMP-TFSI (20) | — | ACN (70) | Viologen (10 mM) |
| Example 9 | ITO | Fe-MEPE | PMMA (8) | LiClO$_4$ (3) | — | PC (27) | ACN (63) | Viologen (10 mM) |
| Example 10 | ITO | Fe-MEPE | PMMA (7) | LiClO$_4$ (3) | BMlm-BF$_4$ (20) | — | ACN (70) | — |
| Example 11 | ITO | Fe-MEPE | PEO (7) | LiClO$_4$ (3) | BMlm-BF$_4$ (20) | — | ACN (210) | — |
| Example 12 | ITO | Fe-MEPE | PMMA (7) | LiClO$_4$ (3) | BMP-PF$_6$ (20) | — | ACN (70) | — | shows the change in transmittance of the electrochromic device that was heat-treated at a temperature of 50° C. and a relative humidity >85% for 3 hours in Example 3. FIG. 4D is an enlarged view of first cycle curves of FIGS. 4A to 4C.

FIGS. 6A and 6B show the change in transmittance of the electrochromic device that was heat-treated at a temperature of 150° C. and a relative humidity >85% for 3 hours in Example 5 and the electrochromic device that was heat-treated at a temperature of 50° C. and a relative humidity >85% for 3 hours in Example 6.

In any of the electrochromic devices illustrated in FIGS. 4A, 4B, 4C, 4D and 5, when the applied voltage was switched from +3.0 V to −3.0 V, the absorbance at a wavelength of 580 nm reached a predetermined value (that is, coloring), and when the applied voltage was switched from −3.0 V to +3.0 V, the absorbance at a wavelength of 580 nm decreased (that is, decoloring). When −3.0 V (or 0 V) was applied, it was in a reduced state, an Fe ion of Fe-MEPE was divalent, and a purple color appeared. When +3.0 V was applied, it was in an oxidized state and an Fe ion was trivalent. On the other hand, the electrochromic device illustrated in FIGS. 6A and 6B were similar except that it was in a reduced state when −3.5 V was applied and was in an oxidized state when +3.5 V was applied. From this, it was confirmed that the electrochromic devices of Examples 2 to 6 exhibited electrochromism.

According to FIGS. 4A to 4C and FIG. 6A, even when the redox of the electrochromic devices of Example 2, Example 3, and Example 5 was repeated 100 times, the value of the transmittance in the reduced state did not substantially change and the durability was excellent. On the other hand, according to FIG. 5 and FIG. 6B, when the redox of the electrochromic devices of Example 4 and Example 6 was repeated 100 times, the value of the transmittance in the reduced state was decreased and the durability was inferior.

From this, the organic/metallic hybrid polymer (here, Fe-MEPE) and the ionic liquid (here, BMP-TFSI) were ionically bonded by using the electrolyte material containing the ionic liquid, even without performing the heat treatment in step S330 of FIG. 3, and the composite was formed. This shows that it was possible to obtain the electrochromic device having the electrochromic layer with excellent durability. That is, it was shown that the composite in which the organic/metallic hybrid polymer and the ionic liquid were ionically bonded acted as the electrochromic material with excellent durability.

The results are examined in detail. According to FIGS. 4A to 4C, the contrast ratio of the electrochromic device of Example 2 in which the heat treatment temperature was higher than 50° C. and lower than 200° C. was significantly greater than that of Example 3 in which the heat treatment temperature was 50° C. Also, according to FIG. 4D, the response speed of the electrochromic device of Example 2 in which the heat treatment temperature was higher than 50° C. was significantly faster than that of Example 3 in which the heat treatment temperature was 50° C. The electrochromic device of Example 3 in which the heat treatment temperature was 200° C. showed a significantly decreased contrast ratio. This shows that Fe-MEPE was damaged by a temperature that was as high as 200° C.

Similarly, according to FIGS. 6A and 6B, the contrast ratio of the electrochromic device of Example 5 in which the heat treatment temperature was higher than 50° C. was significantly greater than that of Example 6 in which the heat treatment temperature was 50° C.

From this, the composite of the present invention in which the organic/metallic hybrid polymer and the ionic liquid were ionically bonded by using the electrolyte material containing the ionic liquid, even without performing the heat treatment in step S330 of FIG. 3 was formed. However, it was shown that heat treatment (preferably higher than 50° C. and lower than 200° C.) was desirable in order to ensure practically endurable response properties and contrast ratio in addition to durability.

Although not illustrated, it was confirmed that electrochromism was exhibited by redox even in the electrochromic devices of Examples 7 to 11. The above results are summarized in Table 3 for simplicity and illustrated with reference to Table 3.

TABLE 3

List of electrochromic characteristics of electrochromic devices of Examples 2 to 7, 10, and 11 at room temperature

| Example No. | Heat Treatment Temperature (° C.) | Humidity (%) | Time (h) | Decoloring time $t_b$ (s) | Coloring time $t_d$ (s) | $\Delta T_i$ (%) | $\Delta T_{100}/\Delta T_i$ (%) |
|---|---|---|---|---|---|---|---|
| Example 2 | 100 | >85 | 3 | 4.70 | 1.50 | 26 | >99 |
| | 150 | >85 | 3 | 1.73 | 1.18 | 14 | >99 |
| | 150 | 50 | 3 | 2.65 | 0.15 | 32 | >99 |
| Example 3 | 50 | >85 | 3 | 2.02 | 1.88 | 6.0 | >99 |
| Example 4 | 50 | >85 | 3 | 1.91 | 0.96 | 52 | 63 |
| Example 5 | 100 | >85 | 3 | 2.98 | 0.37 | 33 | 92 |
| | 150 | >85 | 3 | 2.67 | 0.76 | 40 | >99 |
| Example 6 | 50 | >85 | 3 | 4.29 | 0.54 | 38 | 86 |
| Example 7 | 50 | 50 | 3 | 12.6 | 8.42 | 18 | 0 |
| Example 10 | >50 | 50 | 3 | *1 | *1 | *1 | 0 |
| Example 11 | >50 | 50 | 3 | 25.4 | 2.00 | 33 | 0 |

*1: Gel became cloudy and could not be measured. Since electrochromism was lost in several times, durability was zero.

In Table 3, $\Delta T_i$ (%) is a value of transmittance at a wavelength of 580 nm in the 1st redox cycle and represents a contrast ratio. $\Delta T_{100}/\Delta T_i$ (%) is the ratio of a 100th value to a value of transmittance at a wavelength 580 nm in the 1st redox cycle and represents durability.

As shown in Table 3, the response properties (decoloring time and coloring time) and the contrast ratio of the electrochromic device of Example 2 were comparable to those of Example 4 without using the ionic liquid (that is, having no composite of the present invention in the electrochromic layer). The durability of the electrochromic device of Example 2 was significantly more excellent than that of Example 4. Furthermore, when comparing the response properties and the contrast ratio of the electrochromic device of Example 2 with those of Example 3, both were remarkably improved by performing heat treatment at a temperature that was generally higher than 50° C. and lower than 200° C.

From these, it was shown that the electrochromic device of the present invention in which the electrochromic layer containing the composite of the present invention was reliably formed by the heat treatment (preferably a temperature of higher than 50° C. and lower than 200° C.) had practically worthy response properties and contrast ratio and had extremely excellent durability.

As shown in Table 3, the response properties (decoloring time and coloring time) and the contrast ratio of the electrochromic device of Example 5 were generally superior to those of Example 7 without using the ionic liquid (that is, having no composite of the present invention in the electrochromic layer). When comparing the response properties and the contrast ratio of the electrochromic device of Example 5 with those of Example 6, both were remarkably improved by performing heat treatment at a temperature that was generally higher than 50° C. and lower than 200° C. In the electrochromic device of Example 7, since the ionic conductivity of the electrolyte layer used was low, electrochromism was lost in several times and the electrochromic device stopped operating.

From these, since the electrochromic layer contained the composite of the present invention, the electrochromic device according to the invention exhibited excellent electrochromic properties. Since the electrolyte layer further contained the ionic liquid and had high ionic conductivity, the electrochromic device of the present invention exhibited improved durability.

It was confirmed that the electrochromic device of Example 8 showed a tendency similar to those of Example 2 and Example 5.

Since the electrolyte layer became cloudy, the electrochromic device of Example 10 had a low color contrast. Furthermore, since electrochromism was lost by applying a voltage several times, the electrochromic device of Example 10 had no durability. In the electrochromic device of Example 11, no cloudiness of the electrolyte layer was observed, but response properties were poor and electrochromism was lost in several times. It was predicted that these were caused by deterioration due to the redox of the ionic liquid. From this, the ionic liquid contained in the composite of the present invention preferably has electrochemical stability. Specifically, it was confirmed that the ionic liquid preferably should have a potential window in the range of at least from −1 V vs Ag/Ag$^+$ or less to +2 V vs Ag/Ag$^+$ or more, and more preferably a potential window in the range of from −3 V vs Ag/Ag$^+$ or less to +3 V vs Ag/Ag$^+$ or more.

Next, the heat resistances of the electrochromic devices of Examples 2 to 11 will be described. Table 4 shows a list of the damage degrees and the electrochromic properties of the electrochromic devices according to Examples 2 to 4, 8, and 9 in detail.

TABLE 4

List of damage degrees and electrochromic characteristics of electrochromic devices of Examples 2 to 4, 8 and 9 after redox was repeated 100 times at high temperature (80° C.)

| Example No | Heat Treatment Temperature (° C.) | Humidity (%) | Time (h) | Aspects of Color Change |
|---|---|---|---|---|
| Example 2 | 150 | 50 | 3 | There was no damage to substrate. Higher contrast electrochromism than that of Examples 3 and 4 was confirmed. |
| Example 3 | 50 | >85 | 3 | Although subrate was slightly damaged, higher contrast electrochromism than that of Example 4 was confirmed. |
| Example 4 | 50 | >85 | 3 | Substrate was severely damaged, and electrochromism characteristics were also lost. |
| Example 8 | >50 | 50 | 3 | There was no damage to substrate. Higher contrast electrochromism than that of Examples 3 and 4 was confirmed. |
| Example 9 | >50 | 50 | 3 | There was no damage to substrate. Higher contrast electrochromism than that of Examples 3 and 4 was confirmed. |

When comparing the electrochromic device of Example 3 with that of Example 4, it has been found that a damage to the substrate was reduced by including the composite of the present invention in the electrochromic layer even in a small amount. Of course, since the electrochromic device of Example 2 contained a sufficient amount of the composite of the present invention in the electrochromic layer, a damage to the substrate was further reduced than that of Example 3 and moreover, a higher contrast electrochromism than those of Example 3 and Example 4 was observed.

Both the electrochromic devices of Example 8 and Example 9, in which viologen was used as the ion accumulation material in the electrolyte layer, had no damage to the substrate, and electrochromism with higher contrast than those of Example 3 and Example 4 was observed. In particular, the electrochromic device of Example 8 exhibited a high contrast ratio.

From this, it has been shown that the heat resistance was improved by including the composite of the present invention in the electrochromic layer, and the heat resistance was further improved by containing the ion accumulation material in the electrolyte layer.

INDUSTRIAL APPLICABILITY

Since the composite according to the present invention can have excellent electrochromic properties, heat resistance, and durability, the composite can be used for any device utilizing coloring and decoloring thereof. Specifically, the composite according to the present invention can be applied to a display element, a light control element, and an electronic paper.

What is claimed is:
1. A composite comprising:
an organic/metallic hybrid polymer containing an organic ligand and a metal ion coordinated to the organic ligand; and
an ionic liquid,
wherein the organic/metallic hybrid polymer forms ionic bonds with the ionic liquid, and wherein the organic/metallic hybrid polymer is an organic/metallic hybrid polymer represented by a general formula selected from the group consisting of general Formulae (I), (II), and (III):

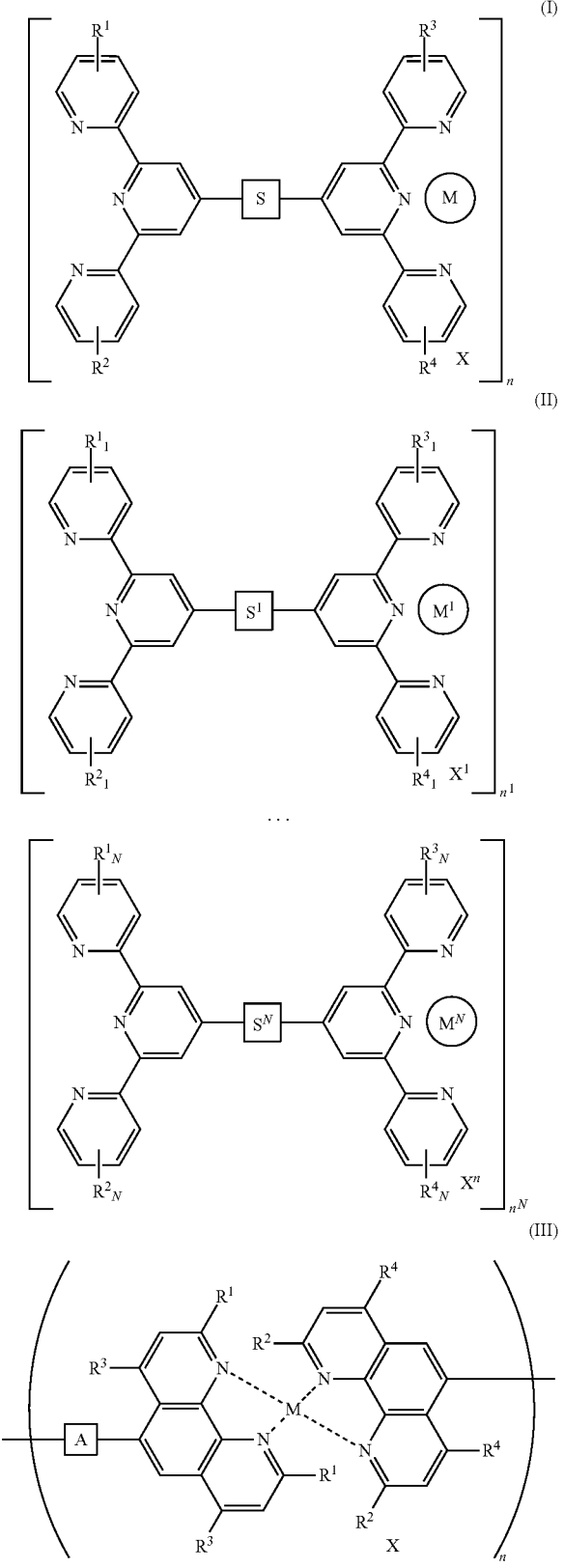

wherein, in Formula (I), M represents a metal ion, X represents a counter anion, S represents a spacer containing a carbon atom and a hydrogen atom or a spacer directly linking two terpyridine groups, $R^1$ to $R^4$ each independently represent a hydrogen atom or a substituent, and n is an integer of 2 or more representing the degree of polymerization, in Formula (II), $M^1$ to $M^N$ (N is an integer of 2 or more) each independently represent metal ions having different redox potentials, $X^1$ to $X^n$ (n is an integer of 2 or more) each independently represent a counter anion, $S^1$ to $S^N$ (N is an integer of 2 or more) each independently represent a spacer containing a carbon atom and a hydrogen atom or a spacer directly linking two terpyridine groups, $R^1_1$ to $R^1_N$, $R^2_1$ to $R^2_N$, $R^3_1$ to $R^3_N$, and $R^4_1$ to $R^4_N$ (N is an integer of 2 or more) each independently represent a hydrogen atom or a substituent, and $n_1$ to $n_N$ are each independently an integer of 2 or more which represents the degree of polymerization, and in Formula (III), M represents a metal ion, X represents a counter anion, A represents a spacer containing a carbon atom and a hydrogen atom or a spacer directly linking two phenanthroline groups, $R^1$ to $R^4$ each independently represent a hydrogen atom or substituent, and n is an integer of 2 or more which represents the degree of polymerization, wherein the ionic liquid is 1-butyl-3-methylimidazolium tetrafluoroborate or a combination of an anion selected from the group consisting of allyl sulfonate, tetrafluoroborate, hexafluorophosphate, and bis(trifluoromethanesulfonyl)imide and a cation selected from the group consisting of 1-ethyl-l-methylimidazolium, pyrrolidinium, and tetraalkylammonium, wherein the organic/metallic hybrid polymer and the ionic liquid are contained such that a molar ratio of the ionic liquid to a repeating structural unit of the organic/metallic hybrid polymer is 0.1 or more and 4.0 or less, and wherein the ionic liquid has a melting point of 0° C. or less.

2. The composite according to claim 1, further comprising an organic/metallic hybrid polymer containing an organic ligand, wherein the organic ligand is selected from the group consisting of a bipyridine group, an imino group, and derivatives thereof, and a metal ion coordinated to the organic ligand.

3. The composite according to claim 1, wherein the metal ion is a metal ion selected from the group consisting of Pt, Cu, Ni, Pd, Ag, Mo, Fe, Co, Ru, Rh, Eu, Zn, and Mn.

4. The composite according to claim 1, wherein the ionic liquid has a potential window ranging from a negative potential of at least −1 V vs. Ag/Ag$^+$ or less to a positive potential of +2 V vs. Ag/Ag$^+$ or more.

5. The composite according to claim 1, wherein the organic/metallic hybrid polymer and the ionic liquid are dissolved in a solvent selected from the group consisting of water, dimethylformamide, dimethylsulfoxide, ethanol, and methanol.

6. The composite according to claim 1, wherein the organic/metallic hybrid polymer and the ionic liquid are contained such that a molar ratio of the ionic liquid to a repeating structural unit of the organic/metallic hybrid polymer is 0.5 or more and 3.0 or less.

7. A method for producing the composite according to claim 1, comprising:

a step of contacting the organic/metallic hybrid polymer, which contains the organic ligand and the metalion coordinated to the organic ligand, with the ionic liquid.

\* \* \* \* \*

UNITED STATES PATENT AND TRADEMARK OFFICE
CERTIFICATE OF CORRECTION

PATENT NO. : 11,203,688 B2
APPLICATION NO. : 16/318634
DATED : December 21, 2021
INVENTOR(S) : Masayoshi Higuchi et al.

Page 1 of 1

It is certified that error appears in the above-identified patent and that said Letters Patent is hereby corrected as shown below:

In the Claims

Column 30, Claim 1, Line 33, after "consisting of", insert --imidazolium,--.

Column 30, Claim 1, Line 34, after "," at end of line, insert --and--.

Column 31, Claim 7, Line 2, delete "metalion" and insert in its place --metal ion--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*